US012226921B2

(12) United States Patent
Halucha et al.

(10) Patent No.: US 12,226,921 B2
(45) Date of Patent: Feb. 18, 2025

(54) LOCKABLE TOOL WITH SLIDING SCALE RELEASE

(71) Applicant: Latama, LLC, Montauk, NY (US)

(72) Inventors: Walter Halucha, Montauk, NY (US); James Fang, Parsippany, NJ (US); J. Reese Weiland, Jr., Riverview, FL (US)

(73) Assignee: LATAMA, LLC, Montauk, NY (US)

( * ) Notice: Subject to any disclaimer, the term of this patent is extended or adjusted under 35 U.S.C. 154(b) by 256 days.

(21) Appl. No.: 18/100,136

(22) Filed: Jan. 23, 2023

(65) Prior Publication Data

US 2023/0150152 A1 May 18, 2023

Related U.S. Application Data

(63) Continuation-in-part of application No. 17/572,711, filed on Jan. 11, 2022, now Pat. No. 12,036,687, which is a continuation-in-part of application No. 16/689,620, filed on Nov. 20, 2019, now Pat. No. 11,254,021, which is a continuation-in-part of application No. 15/792,204, filed on Oct. 24, 2017, now Pat. No. 10,569,432.

(60) Provisional application No. 62/436,570, filed on Dec. 20, 2016.

(51) Int. Cl.
*B26B 5/00* (2006.01)
*B26B 1/04* (2006.01)
*B26B 1/08* (2006.01)

(52) U.S. Cl.
CPC ................ *B26B 1/08* (2013.01); *B26B 1/048* (2013.01)

(58) Field of Classification Search
CPC .. B26B 5/00; A45D 24/08; B24B 3/54; B67B 7/04; B25B 15/00; B25B 23/16
See application file for complete search history.

(56) References Cited

U.S. PATENT DOCUMENTS 3,079,686 A 3/1963 Christy
4,389,776 A 6/1983 Okada
5,111,581 A 5/1992 Collins
5,325,588 A 7/1994 Rogers
5,425,175 A 6/1995 Rogers
5,475,925 A * 12/1995 Newman ................ B26B 5/001 30/162
5,735,051 A * 4/1998 Berns ...................... B26B 5/005 30/329
5,878,500 A 3/1999 Emerson
5,915,792 A 6/1999 Sakurai
5,964,035 A 10/1999 Poehlmann
6,122,829 A 9/2000 McHenry et al.
6,427,335 B1 8/2002 Ralph
6,438,848 B1 8/2002 McHenry et al.
(Continued)

*Primary Examiner* — Omar Flores Sanchez
(74) *Attorney, Agent, or Firm* — Dilworth & Barrese, LLP

(57) ABSTRACT

A lockable tool with a sliding scale release is formed with a frame and a tool coupled to the frame with a locking mechanism to lock the tool into an extended or retracted configuration. A release mechanism is attached to a scale on the side of the frame. The scale is coupled to the frame. The tool is constructed such that sliding the scale along a longitudinal axis of the frame automatically unlocks the tool from the extended or retracted configurations. The tool can open and/or close automatically. The tool, such as a knife, can swing open or extend out a front opening in the frame.

21 Claims, 17 Drawing Sheets

(56) References Cited

U.S. PATENT DOCUMENTS

| | | | |
|---|---|---|---|
| 6,826,836 B1 | 12/2004 | Lin | |
| 7,036,174 B2 | 5/2006 | Painsith | |
| 7,107,686 B2 | 9/2006 | Linn | |
| 7,249,417 B2 | 7/2007 | Chu | |
| 7,562,454 B2 | 7/2009 | Steigerwalt et al. | |
| 7,562,455 B2 | 7/2009 | McHenry et al. | |
| 7,748,122 B2 | 7/2010 | Duey | |
| 7,854,067 B2 | 12/2010 | Lake | |
| 8,281,437 B2 | 10/2012 | Lake | |
| 8,375,590 B2 | 2/2013 | Duey | |
| 8,499,460 B1 | 8/2013 | Pearman | |
| 8,549,754 B2 | 10/2013 | Bung | |
| 9,227,330 B2 | 1/2016 | Felows | |
| 9,346,176 B2 | 5/2016 | Collins | |
| 9,505,141 B2 | 11/2016 | Duey | |
| 9,527,218 B2 | 12/2016 | Valdez | |
| 9,579,807 B2 | 2/2017 | Chu | |
| 9,764,485 B1 | 9/2017 | Hawk | |
| 2011/0099817 A1 | 5/2011 | Duey et al. | |
| 2014/0115898 A1 | 5/2014 | Collins | |
| 2023/0292906 A1* | 9/2023 | Rabinovici | A45D 24/08 132/200 |

* cited by examiner

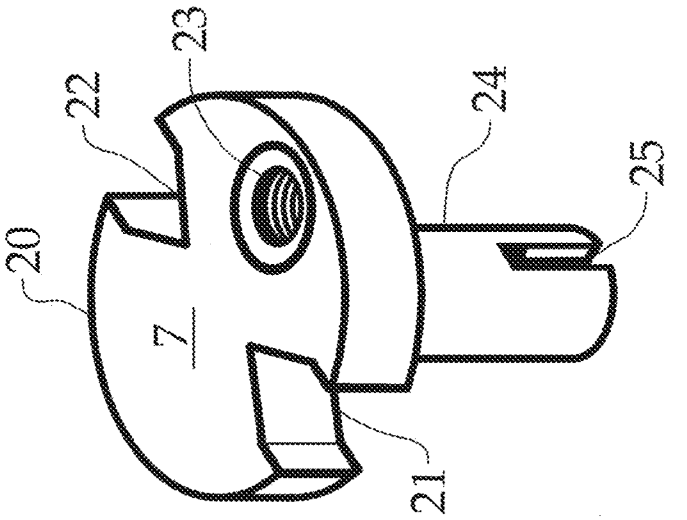
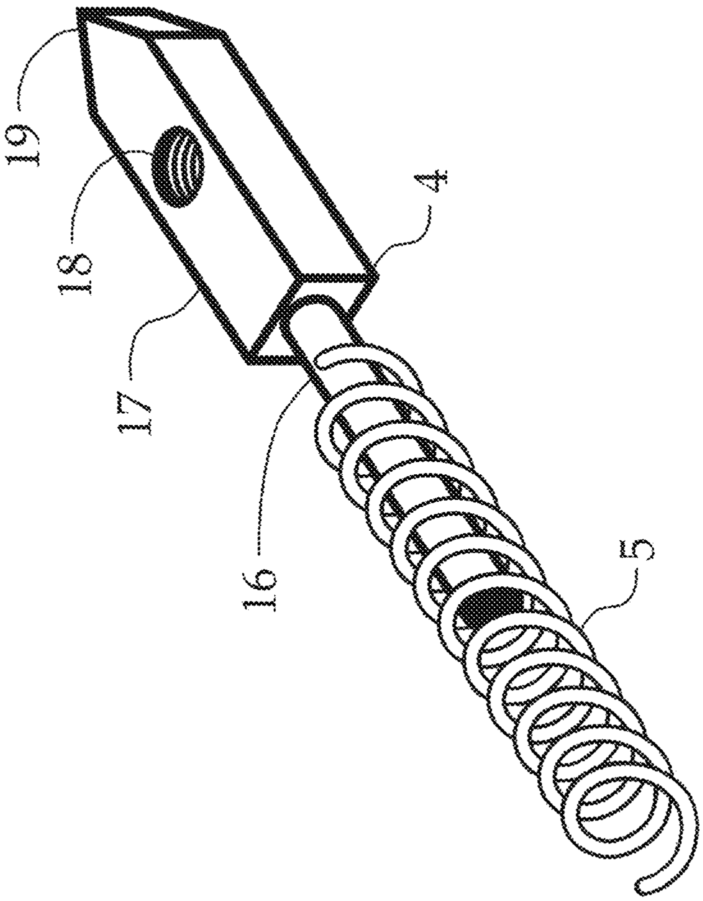
Fig. 2

Fig. 5a Fig. 5b Fig. 5c Fig. 5d

Prior Art

LOCKABLE TOOL WITH SLIDING SCALE RELEASE

CROSS REFERENCE TO RELATED APPLICATIONS

This application claims priority to Ser. No. 17/572,711, filed Jan. 11, 2022, which itself claims priority to Ser. No. 16/689,620, filed Nov. 20, 2019, which itself claims priority to Ser. No. 15/792,204, filed Oct. 24, 2017, and to provisional application Ser. No. 62/436,570, filed Dec. 20, 2016. The entire contents of these applications are incorporated herein by reference.

BACKGROUND

The invention relates generally to lockable tools, such as knives, which can be opened with the activation of a release.

Lockable knives and other tools, e.g., with spring biased blades, have a variety of configurations and release button designs. For example, some knives have a reciprocating (sliding) button and are referred to as having Flylock mechanisms. Existing Flylock sliding buttons generally move along the long longitudinal length axis of the knife, within an opening in a distal portion of the handle. As used herein, for purposes of reference only, an open knife will be referred to as oriented with the free tip of the blade at the distal end and its blade edge facing upwards, to define a front left side of the handle and a rear right side of the handle. When closed, the tip will point in the proximal direction with the blade edge facing downwards and protected, with a front left handle side and a right rear handle side.

The side of the handle portion of a Flylock design knife is typically only a cover plate ("scale"), and not part of the frame or opening mechanism. Flylock mechanisms typically have a complex multiplicity of parts, including pins, springs, levers, cams and screws that are factory assembled into a permanent unit. Typically, they are not internally user serviceable, and are not readily reconfigurable for both left-hand and right-hand activation. FIG. 5*a* shows a Flylock style knife 501 with a scale 510 installed and a sliding button 511 for releasing the Flylock mechanism showing through an opening 512 in scale 510. FIG. 5*b* shows Flylock style knife 501 with scale 510 removed. Sliding button 511 in the direction of arrow 521 lifts a square tip sear 520 out of a square cut recess cavity 521 in a blade 522 (not shown), and a resilient member (not shown) causes the knife to automatically swing from a closed to the open position shown in FIGS. 5*a* and 5*b*. Knife 501 is closed manually.

FIG. 5*c* illustrates a conventional knife 550 activated by the pivoting or rocking motion in the direction of an arrow 551 of an external handle scale 552 on knife 550. FIG. 5*d* depicts knife 550 of FIG. 5*c*, with scale 552 removed, showing an internal spring plate and a sear bellcrank/toggle. The parts of these conventional knives require multiple fasteners and are commonly factory finished. This makes them inconvenient for users to service or reconfigure. Many conventional scale release knives have square cut sears and sear holes. These interacting parts, by nature of a factory manufacturing method, require tolerance clearance to fit together. The resulting tolerance fit leave micro-gaps in the machinery that have a cumulative effect resulting in potential blade wiggle in either open or closed positions. This is observable in surviving Flylock style knives manufactured in the early 1900's, and also in modern knives, as part surfaces wear with age, increasing the loose play in an "locked" blade.

In addition to the complexity of conventional mechanisms, the appearance of these mechanisms can be undesirable. For example, buttons and levers can be unsightly. They can also be difficult to manipulate under certain circumstances.

These and other shortcomings in the prior art are addressed by the present invention.

SUMMARY OF THE INVENTION

An easy opening lockable tool, with a sliding scale north-south (front-rear) release along the longitudinal axis of the tool, is provided by the present disclosure. The tool, such as a knife, can be configured for both right-hand and left-hand use. It can have fewer parts and can be easily serviced or reconfigured by a user. Tools in accordance with the invention can have a sliding scale that can be moved in the distal-proximal/north-south/forward-rearward direction along the longitudinal axis of the tool to activate the release to permit automatic or manual opening and/or closing of the tool. The tool can include a frame with two opposing side walls and a gap therebetween to receive the tool. The tool can swing out the top of the cavity, between open and closed configurations. It can be spring biased or swung with a flip of the wrist. Alternatively, the tool can have an out-the-front opening mechanism, with closed top and bottom edges and a front (distal) opening through which the tool can extend and retract. Each side wall can be the mirror image of the other, for reconfiguration for use by the opposite hand. By slidably mounting the scales on the frame and coupling the scale to the release mechanism, the unlocking mechanism can be activated by reciprocating the scale along the longitudinal axis.

In one embodiment of the invention, one and preferably both of the walls can have an opening, such as a keyhole shaped opening having a round portion near the distal end of the wall and a slot proximal to the round portion. The opening can be shaped to receive a circular cam that can be joined to a resilient member, such as a coil kick spring that biases the cam to rotate. Without the spring, it can be opened with a flip of the wrist. The cam can be joined to the tool, to automatically swing the tool open when the cam is released. If present, the slot of the keyhole can have a shelf at its proximal end.

A sear can be provided to releasably lock the cam in place, with the tool in the open or closed position. The sear can be biased in camming engagement with the cam, preferably in the distal direction. The sear can have a head for engaging the cam and a shaft extending proximally from the head. The proximal end of the sear shaft can be placed on the shelf. The head portion at the distal end can be a projection (or receptacle) for engaging a corresponding projection (or receptacle) on the cam. For example, the sear head can be wedge shaped and nest into one of a pair of V-shaped grooves in the cam or grooves on the sear head can receive projections on the camming surface. The grooves or projections are preferably symmetric and on opposite sides of the cam, one to lock the cam and the tool open and one to lock the tool closed. In another embodiment of the invention, the wedge or grooves can be formed on a base of the tool, which rotates around a shaft or axle. The tool can be biased into the open position by a spring. In another embodiment of the invention, the scale can be biased into the direction of the groove (or wedge) and the sear can be coupled to the scale. In this embodiment, the sear is indirectly biased into the locking engagement. In still another embodiment of the invention, the tool opens out-the-front by a conventional mechanism that is activated by sliding the scale along the longitudinal axis. Reciprocating the scale, which is coupled to the activation mechanism, along the longitudinal axis, unlocks the tool so that it will automatically open or close.

In one embodiment of the invention, one side of the tool can include a sliding cover (scale) coupled to the sear. In one embodiment of the invention, the cam or tool can be biased into the open position. If the tool is locked in the closed position, sliding the scale proximally along the longitudinal axis can unlock the cam or other mechanism and permit the resilient member to rotate the cam (or tool), which in turn, kicks open the tool. Releasing the handle can permit the sear to advance into the cam and eventually the groove in the cam and lock the tool in an open position. To close the tool, the handle is again slid proximally to release the cam from the sear, and the tool can be closed by hand. The scale/cover is released and the sear is resiliently urged in the distal direction and engages a groove on the cam to lock the tool back in the closed position.

The sear can have a chisel or wedge shape tip head at its distal end or a matching groove. The circular cam can include V-shaped notches that match a V-shaped sear head or a wedge shaped projection to engage a notch in the tip of the sear. The head can act a cam follower and wedge into the V-notches in the open and the closed positions. This wedging action produces an open blade that locks more stiffly in place, with less movement or play than many other configurations.

In one embodiment of the invention, the tool can be fit together similarly to a mechanical puzzle and requires only two fasteners, such as screws or pins—one to connect the scale to the sear and one to connect the cam to the tool. All the other parts can be configured and arranged to fit together into place like a three dimensional jigsaw puzzle.

The major components of a tool in accordance with the invention can comprise the tool assembly (a blade or other tool), which is coupled to a cam, which can be coupled to a resilient member such as a coil kick spring; a handle assembly (a frame and one or two sliding covers); and the release assembly (the sear coupled to a cover and resiliently biased into and interacting with the cam). These elements can be puzzle fit and hold themselves in place. The screws or pins fasten together the moving sub-assemblies. The screws or pins are internal and need not be seen when the tool is assembled. This provides a clean outward appearance, without visible pins or screws.

The scale release front (left side) scale button is preferably flush and can match the rear (right side) scale cover plate, which only functions to cover the internal mechanism and need not perform a mechanical function other than sealing. Alternatively, both scales can function to activate separate releases for separate tools. Thus, when the tool is a knife, it can appear to be a trick knife with no visible release or activator.

Tools in accordance with the invention can be made to be user serviceable, and require no special tools to disassemble and reconfigure between left hand or right hand operation. Thus, this tool design, referred to as a scale release/hidden button design, can include parts, assemblies, features and qualities that constitute, e.g., a knife with a folding blade that may be spring operated that locks open and locks closed.

The handle body frame can be a one-piece item with a "C" or "U" shaped channel cross section, having two opposing walls and creating a blade well cavity for receiving the blade (or other feature) in a closed position. An out-the-front embodiment can have no open sides or top/bottom edges, and has an open front. The handle body can include dovetail groove tracks cut along the long axis of one or both sides of the exterior of the handle body and the scale can ride in those tracks. Thus, some, but not all the frame is covered. Alternatively, the dovetail groove can be on the inside of the scale and a rib on the frame can ride in the groove and the scale can cover all of the side of the frame. The case can have edges that wrap around the sides of the frame and cover the frame from top to bottom. The handle body can include a thru hole to act as a blade pivot bushing inside diameter, through one or both of the frame walls and cavities made to conceal internal components, such as the sear and allow access for internal assembly.

In another embodiment of the invention, the tool has an out-the-front opening mechanism. For example, the tool can have the mechanism described and depicted in U.S. Pat. No. 7,562,455, the entire contents of which are incorporated herein by reference. This mechanism can be activated by coupling the release to the scale and then activating the release mechanism by sliding the scale along the longitudinal axis.

The handle features and following internal parts combine to produce an external appearance of a preferred operating mechanism that is sleek and without visible fasteners. The blade locking device can include a chisel point (wedge shaped) sear that by nature of its physical shape as a wedge, can force the blade to come to battery or precisely stop in position with low wiggle or play. The chisel point sear can interact with a matching V-notched cam surface on a shaft (or vice versa), such as a step-shaft part in a fashion that normal metal fatigue or abrasive wear is not detrimental to the location fit of said parts. Alternatively, the V-notches can be formed into the base of the blade, without the need for a separate shaft. Alternatively, the spring forcing the sear forward can be attached to the scale and the scale can be attached to the sear. Subsequent use will not adversely affect blade alignment, but rather, could cause the contact surface to sharpen and improve the wedge fit.

The V-notch cam surface profile can be on a multifunctional step shaft, which when fastened to the tool blade, can index the blade to both open and closed positions, locate and retain the blade within the handle so that it will not fall out, act as a pivot shaft bushing and bearing for the blade rotation, and act as a fastening point for the resilient member, such as a coil kick spring. Alternatively, the cam shaft can be incorporated into the base of the tool.

A knife or other tool in accordance with the invention can include insert cover plates referred to as scales, that can slide and move inside or over a dovetail groove track, cut along the long axis of both outer sides of the handle body or inside of the scale. The scale multifunctions as both a cover plate and a release mechanism. The scale release can be flush and match the nonfunctional rear scale cover plate in such a way that it appears to be trick knife with a hidden release.

A chisel point sear can be attached to the underside (inner surface) of one of the scales to constitute the operating mechanism sub-assembly or release of the automatic blade. The sear can be attached to the scale with a fastener inserted through openings in the handle body in a manner that the fasteners and sear resilient member, such as a compression spring are hidden from view upon final assembly.

A multifunction step shaft and coil kick spring in accordance with the invention can be manufactured with a thin profile, so as to be easily concealed under the exterior scale cover plates. Using multifunction parts can reduce the total number of parts, which can include 1 blade, 1 sear, 1 sear shaft, 2 handle covers, 1 frame, 2 springs, and 2 screws. The parts can be easily disassembled and reassembled by the user, as opposed to a factory permanent pinned assembly.

The internal parts, handle and blade in accordance with the invention can all be made to be ambidextrous, such that either the front (left) or rear (right) scale activates the release, so that reassembly can be for either right handed or left handed users.

The internal parts can be configured such that the same parts can be used in any blade (or other tool) size and or external profile appearance and provide an easy interchangeability of parts.

The internal chisel point sear and the step shaft device can work with a coil kick spring and also with conventional leaf kick springs inside the blade as well.

The external sliding scale can be surface cut into a trademark design appearance shape or pattern profile without adversely affecting the internal components, in such a way that the trademark shape applied to the folding tool can also be applied to an Out-the-Front (OTF) knife or telescoping blade knife, so as to produce a matching set.

The external sliding scale is interchangeable on existing stockpiles of knives, and can be produced with a variety of grip patterns, semi-precious material inserts, or can be engraved or printed as a billboard with any company Logo.

In another embodiment of the invention, the lockable tool is made with a frame having a rear proximal position, a front distal position, a forward direction along a longitudinal axis from the rear position to the front position. The frame has a first plate extending along the longitudinal axis from the rear to front position. A middle plate is parallel to and aligned with the first plate. A second plate is parallel to and aligned with the middle plate, with a gap between the first plate and the middle plate.

A base of the tool has a first engagement portion or notch and second engagement portion or notch in the tool base and is pivotably coupled to a forward position or slidingly coupled to the frame. The tool is displaceable between a closed, retracted configuration wherein the tool is enclosed within the frame and an open extended configuration outside the frame, wherein the tip points towards the forward direction.

The frame and tool are configured to form a selectively releasable activation mechanism for opening and/or closing the tool. The mechanism has at least one projection selectively and releasably received in the first notch of the tool to lock the tool in the retracted configuration, and to unlock the tool by releasing the projection from the first notch. The second plate is slidably mounted with respect to the middle plate and coupled to the locking mechanism, wherein sliding the second plate along the longitudinal axis with respect to the middle plate moves the projection out of the first notch to unlock the tool, allowing the biasing mechanism to bias the tool into the extended configuration.

The tool can be a knife blade, screw driver, comb, corkscrew or file. The lockable tool can be pivotably coupled to the middle plate with a shaft and can be biased into the open extended configuration with a resilient member coupled to the tool and the frame, to urge the tool to pivot from the retracted to the extended configuration. The tool can include a second notch or other engagement portion to lock the tool in the open configuration. The locking mechanism can be adapted and configured such that a projection extends into the second engagement portion when the blade is in the extended configuration to releasably lock the tool in the extended configuration.

The locking mechanism can be configured and adapted such that sliding the second plate (scale) along the longitudinal axis moves the projection in the horizontal direction out of the first notch. The projection of the locking mechanism can be biased in a horizontal direction and can include an inclined end. An inner surface of the second plate can include an inclined surface, and sliding the second plate along the longitudinal axis can cause the inclined surface of the plate to contact the inclined end of the projection and displace the projection in the opposite horizontal direction to unlock the tool.

The locking mechanism projection base can be of substantially the same shape as the notch. The notch can have a circular shape with a diameter larger than a smallest diameter of the projection base, and the notch has an open portion of the circular shape. The open portion of the notch can have an angle of 80° to 10° of the circular shape. A rod can extend from the projection base in the horizontal direction. The end of the rod can be curved or inclined to interact with an inner surface of the plate, such that moving the plate pushes the rod and thereby, the projection out of the notch.

Other objects, advantages and embodiments of the invention will be apparent from the specification and the drawings and the scope of the invention will be indicated in the claims.

BRIEF DESCRIPTION OF THE DRAWINGS

The present disclosure will become more readily apparent from the specific description accompanied by the following drawings, in which:

FIG. 2 an exploded perspective view of the sear and step shaft cam of the tool with sliding scale release of FIG. 1;

DETAILED DESCRIPTION OF PREFERRED EMBODIMENTS

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Tools in accordance with preferred embodiments of the invention can include a tool mounted on a frame having a length, height and width. The tools are advantageously opened (unlocked) by sliding a scale (side cover) in the north/south direction along the longitudinal lengthwise axis. The scale can have substantially the same height as the frame or be slightly taller or shorter. The scale can ride in a groove on the frame side defined by ridges at the top and bottom of the frame. This can leave the ridges exposed or the scale can wrap around the ridges to substantially cover the side of the frame from the horizontal perspective. The side of the frame can have a rib, and the top and bottom of the scale can wrap around the top and bottom edges of the rib. In both situations, the scale is coupled to the unlocking mechanism.

In another embodiment of the invention, the scale can be secured to the frame with a device extending into the frame. With a security device coupled directly to the frame, a flat engagement of the scale to the frame, that does not involve a mating between the scale and frame, is acceptable. Thus, longitudinal sliding of the scale can unlock and open the tool or unlock an open tool which can close automatically or manually.

Figure 1:
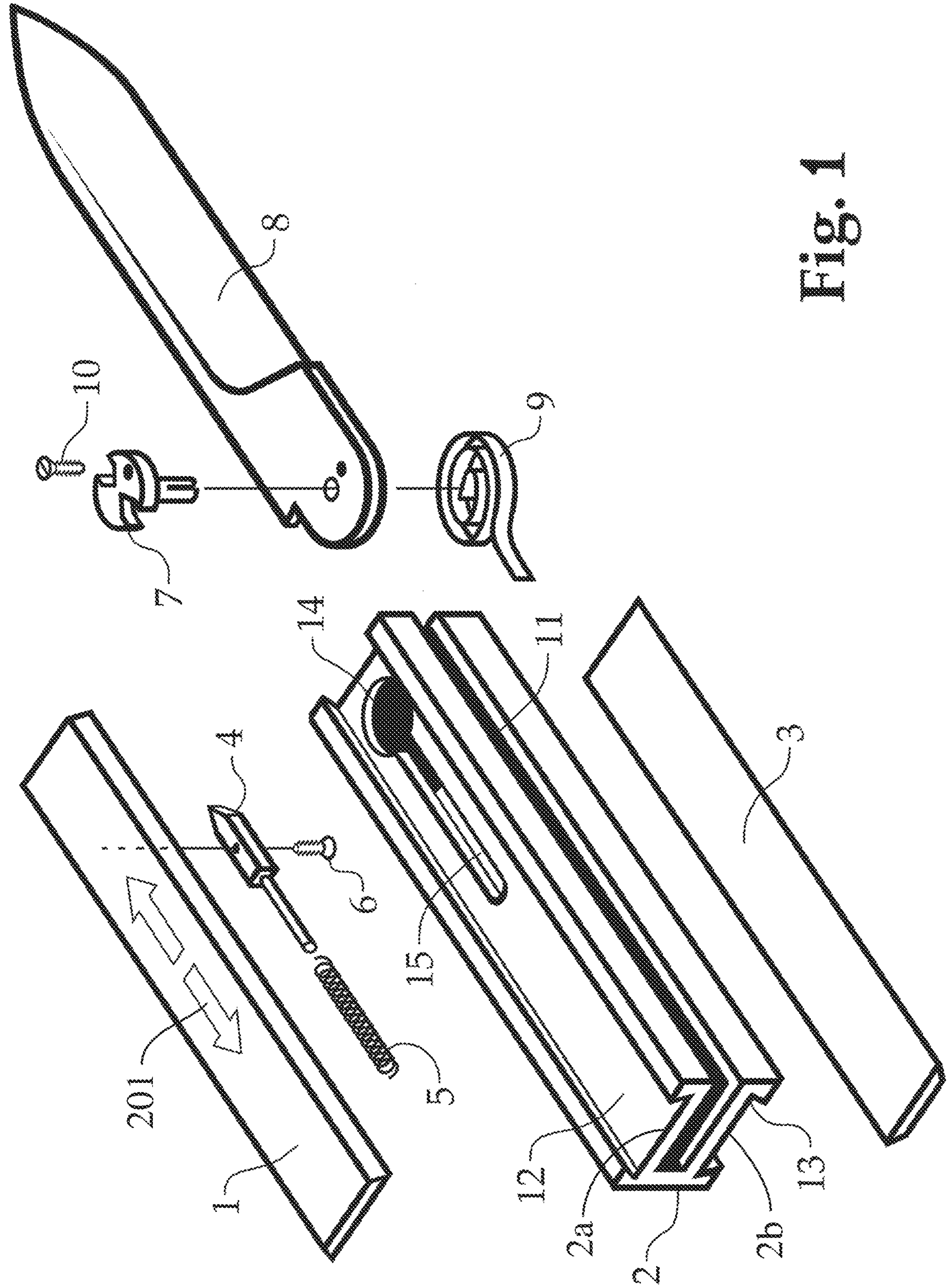
FIG. 1 is an exploded perspective view of a lockable tool, in the form of a knife, with a north-south sliding scale release, according to an embodiment of the present disclosure.

An exploded perspective view of a tool, in accordance with a preferred embodiment of the invention, is shown generally in FIG. 1 in the form of a knife 200. Knife 200 includes a frame 2, having a U-shaped cross section and a front-side dovetail groove 12 on the front (left-hand) side and a rear-side dovetail groove 13 on the rear (right-hand) side. Knife 200 is assembled for right-handed use, wherein it is activated by moving a left side front cover (scale) 1 in the longitudinal north/south direction of an arrow 201. Note that frame 2 is symmetrical and knife 200 can be reassembled as a mirror image for left hand use.

Figure 14:
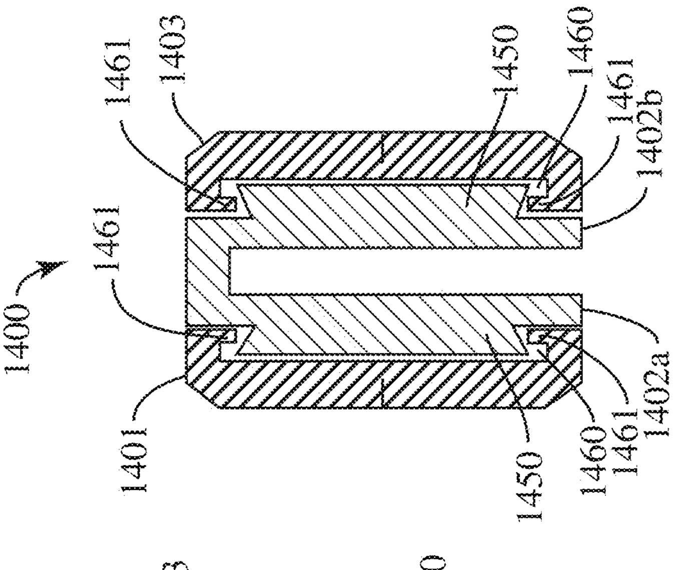
FIG. 14 is a cross-sectional end view of a tool in accordance with another embodiment of the disclosure.
Figure 13:
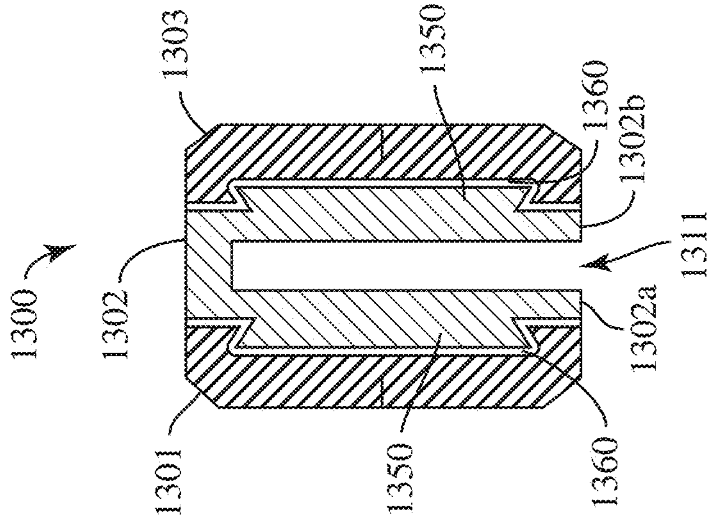
FIG. 13 is a cross-sectional end view of a tool in accordance with another embodiment of the disclosure.
Figure 12:
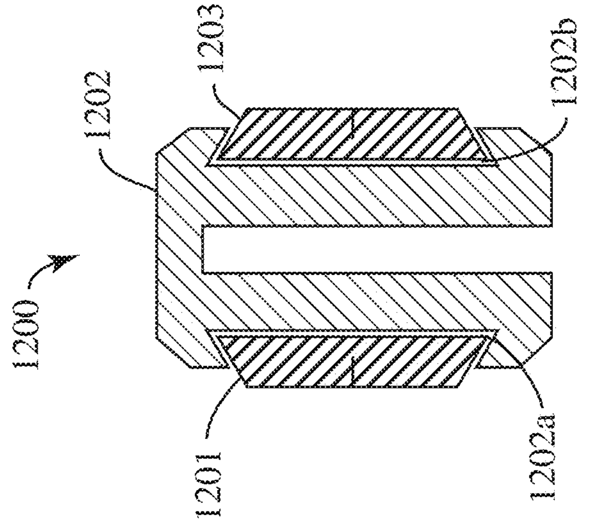
FIG. 12 is a cross-sectional end view of a tool in accordance with an embodiment of the disclosure.

Handle frame 2 can be formed from a metal block, milled so that all features are symmetrical, front and back. Frame 2 can be constructed in other manners, including stamping and welding and other ways as will be apparent to those of skill in the field. Handle frame 2 is formed with two opposing walls, a front wall 2*a*, which faces a rear wall 2*b*, with a blade well cavity 11 therebetween. A front left side scale receiving groove 12 is located on the outside of front wall 2*a* and a rear right side scale receiving groove 13 is located on the outside of rear wall 2*b*. Grooves 12 and 13 are optionally formed in a dovetail fashion to help retain the covers (scales) to frame 2. Additional configurations for slidingly retaining scales 1 and 3 to frame 2 are depicted in FIGS. 12-14. Other configurations will be apparent to those of skill in the art.

Blade well cavity 11 is formed as a narrow gap between walls 2*a* and 2*b*, and is slightly wider than a blade 8. Dove tail grooves 12 and 13 extend along the north/south longitudinal axis of frame 2. Front scale 1 (left side looking down on knife 200 with the distal end facing forward and the open blade facing down) rides in groove 12. Rear scale 3 rides in groove 13. Front scale 1 and rear scale 3 are cut with dovetail edges, to slide into grooves 12 and 13 to retain scales 1 and 3 to frame 2.

Frame 2 is also formed with a pivot hole 14, which has the form of a circular thru hole, completely through frame 2. In other embodiments of the invention, the hole can be through only one of the walls or can be in the form of a recess, not a thru hole. Pivot hole 14 is sized to fit the major diameter of a step shaft 7, preferably with a precise fit. Frame 2 also has a keyseat slot 15, extending proximally from pivot hole 14. Keyseat slot 15 has two sections. The distal section of slot 15, closest to pivot hole 14, is a thru hole extension from pivot hole 14. The proximal section of slot 15 is a true keyseat and has a floor that does not extend all the way through the wall of groove 12. Thus, the proximal end of keyseat slot 15 acts as an internal shelf, and the distal end of slot 15, near pivot hole 14, is a thru hole allowing access to the far side internals for parts assembly. The wall of frame 2 having groove 13 is preferably symmetrical to that of groove 12 and should have a mirror image keyseat slot with a shelf at its proximal end for reconfiguration for left hand use.

Grooves 12 and 13 in frame 2 are identical in size. Front scale 1 has a size allowing a running and sliding fit into dovetail groove 12, so that scale 1 may move along the longitudinal axis with finger or thumb pressure in a strictly reciprocating fashion, as a release activator, as discussed below (see arrow 201 indicator markings on scale 1). The dovetail edges of rear scale 3 are cut slightly wider as a location fit or press fit, so that scale 3 can be removably tapped or pressed into place into frame groove 13, as a cover plate. Scale 3 should fit tightly enough, so as not to move with finger pressure during activation of scale 1. Thus, the dovetail edges of scales 1 and 3 should be cut differently, so that when a user's hand causes scale 1 to move proximally, the user's hand will urge scale 3 in a distal direction, which will wedge scale 3 more firmly in place in groove 13. If reconfigured for left hand use, scale 1 and scale 3 are switched to fit into grooves 13 and 12, respectively, and scale 1 will act as the release and slide in groove 13, with scale 3 motionless in groove 12.

FIG. 2 depicts a sear 4, with a wedge shaped chisel point head 19 at its distal end. Chisel point 19 is preferably formed with two flat sides extending proximally from the point tip. Chisel point 19 is preferably symmetrical. Chisel point 19 of sear 4 also includes a flat side 17 having a connection structure in the form of a screw hole 18 formed all the way or partially through sear 4, proximal from point 19. In alternate embodiments of the invention, hole 18 need not be threaded or fully through sear 4 and can have other attachment structures or a smooth bore. A guide post shaft 16 (FIG. 2) extends proximally from chisel point head 19 of sear 4. A sear spring 5, which is a compression spring, fits over guide post shaft 16 and acts as a resilient member to urge sear 4 in the distal direction.

Figures 3A, 3B:
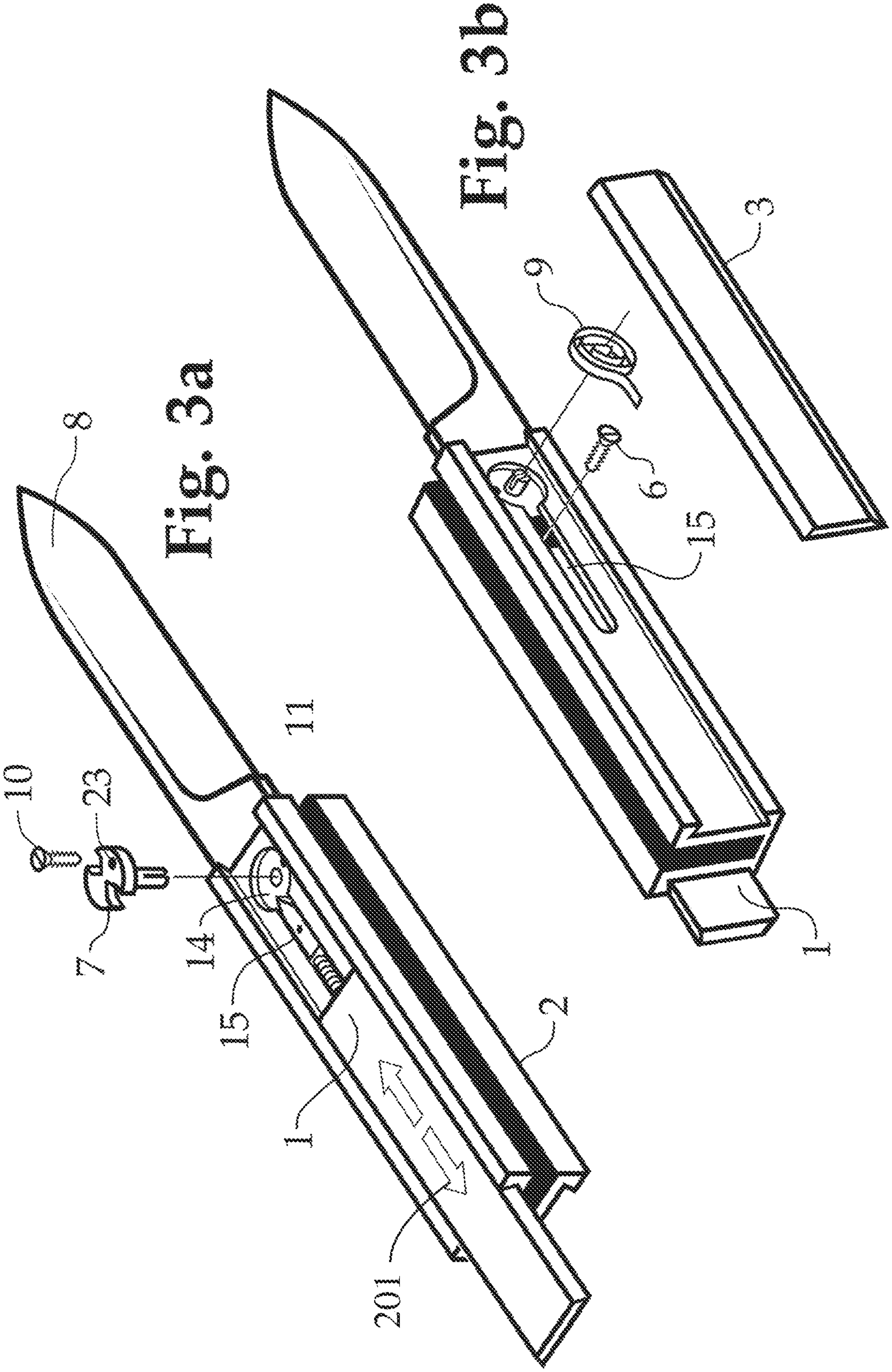
FIGS. 3*a* and 3*b* are partially assembled exploded perspective views of the tool with sliding scale release aligned with the longitudinal axis of the tool of FIG. 1.

Sear 4 and sear spring 5 are inserted into keyseat slot 15 of groove 12. Shaft 16, with spring 5 thereon rests on the shelf of keyseat slot 15. Chisel point head 19 extends in the distal direction, into pivot hole 14. As shown in FIGS. 1 and 3*b*, screw 6 is then inserted into the thru hole portion of slot 15 of groove 13, then the thru hole portion of slot 15 of groove 12, then into a hole in the underside of handle scale 1 (not shown). Thus, scale 1 is connected to sear 4 by screw 6 and they can act as a unit, whereby reciprocating scale 1 along the longitudinal axis can displace sear 4 back and forth along the same axis. Compression spring 5 will keep sear 4 and scale 1 biased in the distal position. Hand pressure can compress spring 5 and move scale 1 and therefore also sear 4 in the proximal direction.

Referring again to FIG. 2, sear 4 acts as a cam follower to a step shaft 7. Step shaft 7 has a major diameter 20 and a minor diameter 24. In other embodiments of the invention, it can have a single diameter or multiple diameters. In still other embodiments (see, e.g. FIGS. 6 and 9), the camming surface can be built into the base of the tool. As shown in FIGS. 3*a* and 3*b*, major diameter 20 nests in pivot hole 14 and is held in place by scale 1 on the front side of groove 12 and by scale 3 on the rear side of groove 13. Before inserting step shaft 7, the proximal portion of a blade 8 is placed in the distal end of frame 2, with the edge of blade 8 facing in the same direction as cavity 11. Minor diameter 24 is inserted through a thru hole 80 in the proximal end of blade 8. Blade 8 is then joined to step shaft 7 by inserting a screw 10 through a screw hole 23 (or smooth hole) in step shaft 7 and into a screw hole 100 in the proximal end of blade 8. Blade 8 and shaft 7 now pivot as a unit about pivot hole 14.

An external end 90 of a coiled kick spring 9 is inserted into a saw cut 25 at the bottom of minor diameter 24. External end 90 of kick spring 9 presses against frame 2. In this manner, kick spring 9 is constructed and arranged to impart a rotational bias against step shaft 7, which in turn imparts rotational bias to blade 8.

With blade 8 in the open position, chisel point 19 of sear 4 will nest in a V-notch 21 (FIG. 2) of major diameter 20. To release blade 8, scale 1 is slid proximally along the longitudinal axis, to detach point 19 from notch 21. The user can then fold blade 8 closed by hand, against the bias of spring 9. Sear 4 acts as a cam follower until blade 8 is in the closed position and a closed position V-notch 22 faces point 19. Scale 1 can then be released and sear 4 (and therefore scale 1) will then move distally and sear 4 will lock into closed position notch 22. To open blade 8, scale 1 is moved proximally along the longitudinal axis; sear 4 disengages from closed position notch 22; spring 9 urges shaft 7 to rotate and cause blade 8 to swing open. Sear 4 follows major diameter 20, until it locks into open position notch 21, to lock blade 8 in the open position. Scale 1, sear 4, spring 5, shaft 7, spring 9 and blade 8 are thereby adapted to cause blade 8 to swing into in the open position when scale 1 is moved in the longitudinal proximal direction to disengage sear 4 from shaft 7.

The parts shown are made such that knife 200 can be disassembled and reassembled into a left-hand or right-hand knife by switching scale 1 and scale 3, moving sear 4 and shaft 7 to slot 15 in groove 13 and reversing sear 4 and screw 6.

Note that compression spring 5, on shaft 16 of sear 4, is coupled to front scale 1 by sear retaining screw 6. That combination constitutes a moving sub-assembly of parts within the whole of knife 200. Also, step shaft 7, with kick spring 9 inserted in cut 25 is coupled to blade 8 by screw 10. It therefore constitutes a separate moving sub-assembly of parts within the whole of knife 200.

Step shaft 7 has multiple purposes and functions. Major diameter 20 of step shaft 7 functions as a main pivot bearing for folding knife blade 8. It also acts as a structural/puzzle retaining piece which will be explained below with reference to FIGS. 3*a* and 3*b*. Major diameter 20 has two symmetrical V-Notches 21 and 22, which are 180 degrees apart, and are sized to match chisel point 19 of sear 4. Screw hole 23 is positioned 90 degrees from the alignment of V-notches 21 and 22. Hole 23 can be a smooth bore for a location pin, but is preferably drilled, threaded and countersunk to be suitable for a flathead screw, to fasten step shaft 7 to knife blade 8.

Minor diameter 24 of step shaft 7 fits into hole 80 in the proximal end of knife blade 8. Minor diameter 24 requires a length sufficient to protrude thru the thickness of knife blade 8. Minor diameter 24 has bottom saw cut 25, on which coil kick spring 9 will act, to impart rotational bias to shaft 7 and thereby, blade 8.

FIGS. 3*a* and 3*b* depict other parts of the assembly, and also illustrate the simplicity of the design, and that the manner of assembly is a mechanical puzzle. Because of the way the parts fit together, only two fasteners, such as screws, are required.

FIG. 3*a* shows the first steps of the preferred assembly of knife 200. First, the proximal end of blade 8 is placed into the distal end of cavity 11 of frame 2. Next, step shaft 7 is inserted thru pivot hole 14 and through hole 80 in the proximal end of blade 8. The jigsaw puzzle fit prevents blade 8 from falling away from frame 2, and allows blade 8 to swing back into cavity 11 into a closed condition and out, into an open condition, typical of a folding pocket knife. Then, step shaft 7 is rotated so that hole 23 aligns with a screw hole 100 of blade 8. Fastener screw 10 is then screwed into hole 100, thus aligning V-Notches 21 and 22 at the correct index point.

Continuing with groove 12 facing up, sear 4 and spring 5 are combined and placed into handle keyseat slot 15. Scale 1 is then inserted into front handle dovetail groove 12, in a sliding, free moving fashion. Scale 1 prevents sear 4 from falling out of key seat slot 15. No additional fasteners are needed.

FIG. 3*b* shows the further steps of the assembly of knife 200. Accessing through pivot hole 14 and the open portion of keyseat slot 15 in frame 2, from the side of groove 13 (FIG. 3*b*), scale 1 is slid until its fastener hole (not shown) is aligned with hole 18 of sear 4. Fastener screw 6 is inserted through the opening in slot 15, and into the hole inside scale 1 to attach sear 4 to the underside of scale 1. Then the inner end of coil kick spring 9 is pressed onto sawcut 25 of the end of minor diameter 24 of step shaft 7. Finally, rear scale 3 is slid into dovetail groove 13 and releasably or permanently wedged (press fit) into place. Rear scale 3 can also be glued into position or left releasable.

Figure 4:
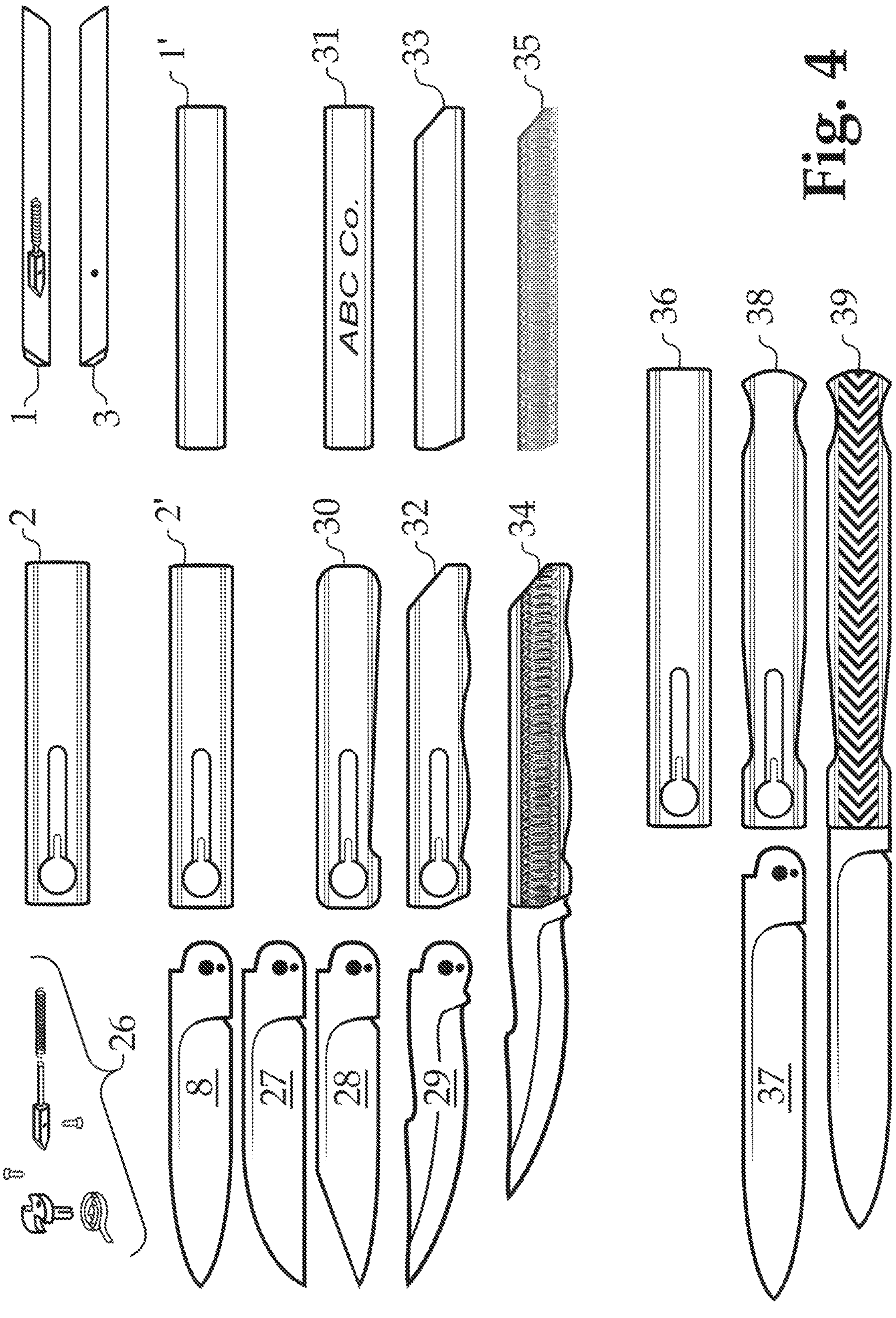
FIG. 4 is a side view of variations on a lockable tool with north/south sliding scale release according to different embodiments of the present disclosure.

FIG. 4 depicts how the blades and covers of a tool in accordance with the invention can be replaced for enhanced production and marketability to amateur knife-makers. One of the benefits of tool designs in accordance with the invention, is that the internal working parts can be standardized and operate with a variety of alternative exterior tool variations. For example, the knife body itself can exhibit changes in the outward appearance and dimensions, without affecting the standard sear, step shaft, springs and screws, which can be stockpiled.

It should be understood that although the present disclosure is described as relating to knife blades, that blade element can be replaced by other tools. For example, the knife blade can be replaced by a saw, a ruler, a file, a screwdriver, a fish scaler, a comb, a cork screw, a bottle opener, a can opener, an ice pick, etc. Other replacement blades are contemplated.

Furthermore, the ease of disassembly and reassembly can make for kits that include a basic handle component with multiple blades and other tool components. Referring to FIG. 4, reference numeral 26 refers to that group of parts (blade pivot shaft, resilient member for the shaft, sear, resilient member for the sear, and two connectors), which are all the internal parts. The automatically opening mechanisms for tools in accordance with the invention can consist essentially of these parts and any other parts can be excluded. These parts can be identical throughout any knife variant. Likewise, a stockpile of handle scales 1 and 3 can be made. The scales should have the male dovetail edges, are square cut, and can run oversize, to be trimmed later.

Scale 1 shows as a reference, the chisel point sear fastened to the underside, which converts a normal cover plate scale, into a sliding release. The basic handle frame 2, can have a rectangular profile. Frame 2 has a large thru bore on one side, which also has a machined key seat stepped slot. Female dovetail tracks run between distal and proximal ends along the length axis. All of this machining enhances the mechanical puzzle effect of the assembly. All of this machining can be confined to the center or one end of the tool body, allowing subsequent modification to the periphery of the handle at a later time. It can be made oversize, to be trimmed later. Other shapes are contemplated.

The second row of parts depicted in FIG. 4, blade 8, a handle body 2', a scale or cover plate 1', can be construed as a basic utility knife, with a minimum of machining to be functional.

Another benefit of a design in accordance with the invention is the user serviceability of the assembly. Rather than a factory fixed assembly, a variety of blades (27, 28 and 29) can be swapped out by a user with relatively low mechanical skill. Even more Swiss army style saws, files and other devices can be produced, including a disposable razor blade holder, requiring only the two-hole pattern in the base of the folding blade. The existing stockpiles of internal parts simply "plug-and-play" with these options.

Another benefit of this design is ease of modification of the handle shape. A handle body 30 that has its profile milled for a tapered hand grip, or another variant profile 32 can be attached. Within specific limits, the handle body can be altered after the fact by a kit buyer to craft his own custom designs.

In another embodiment of the invention, a scale 31 is a potential billboard for engraving or printing is available. Buyers can purchase replacements with various semi-precious inlaid materials, or pre-printed sports logos and so forth.

A scale 33, modified to fit a custom profile, the ends can be changed, but the long sides should remain the dovetail shape to fit the sliding track in the handle body. An assembled fancy profile knife 34, with no visible fasteners can be assembled. A sliding button scale coverplate 35, which has a surface texture grip pattern milled into its top surface can also be provided.

Another benefit of this design is a concern for factory manufacturing. The same setup for a short knife can be used for a longer knife. All of the machining for the release components are on one end of the handle body. Unlike other knives that require custom back spine springs tailored to a specific length, this design permits use of the same basic group 26 for any length knife.

A standard rectangular profile handle body 36, similar to body 2, except longer, a longer blade 37, a custom contour profile 38, an assembly of a long stiletto design 39 with a traction grip pattern sliding scale release button, can all be provided.

Not shown is yet another version possible for collectors, a folding boar knife/trench knife, a folding knife with a long blade that is fitted to a short handle body. When closed, the blade end protrudes like a short sheath knife, only to spring open (by a hidden release sliding scale button) into a full length fighting knife.

The wedge shape of chisel point 19 of sear 4, by nature of its wedging action to lock (open or closed) blade 8, can produce a product that is more solid and robust in both the open and closed positions than previously marketed folding boar knives. All of this is possible by the mix and match/plug and play components, that can be marketed separately or in multi-part kit form.

The scale can be removable and interchangeable to swap out advertising company logos engraved or printed as a billboard, or to swap different grip materials. Matched sets of both a folding design of the disclosure and an out-the-front (OTF) knife with similar outward appearance and the north/south slidable scale release of the invention can be achieved.

The components of the automatic opening tool with north/south sliding scale release described herein can also be provided as a kit to an end user. The tool can be provided to a user disassembled and the user can assemble the components as desired.

Figure 6:
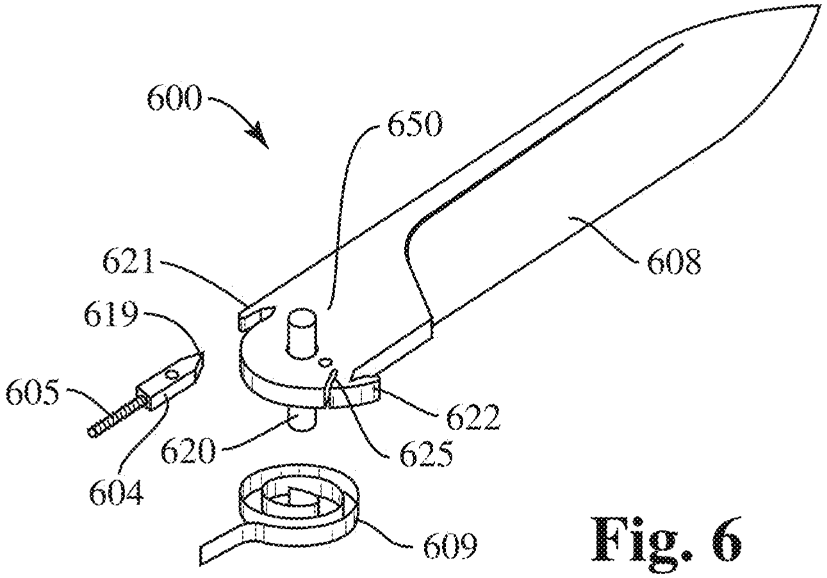
FIG. 6 is a partial exploded perspective view of a tool in accordance with the invention having wedge receiving notches for receiving the wedge shaped tip of a sear, formed into the base of the tool.

FIG. 6 depicts a portion of a lockable tool 600, in accordance with another embodiment of the invention, in which the wedge receiving notch features of the step shaft of tool 200 are combined with a base 650 of a blade 608. Thus, FIG. 6 depicts a blade 608 with an open position V-shaped notch 621 and a closed position V-shaped notch 622 formed into base 650 of blade 608.

An axle 620 replaces stepped shaft 20 of tool 200 and is provided to permit blade 608 to pivot, such as from force provided by a kick spring 609. Axle 620 rides in a frame (not shown) of tool 600. The frame of tool 600 can be otherwise similar to frame 2 of tool 200. An end of kick spring 609 can fit into a cut 625 in base 650 of blade 608. Spring 609 is otherwise held in the frame of tool 600. Notches 621 and 622 are sized to receive a wedge shaped head 619 of a sear 604, urged forward by a spring 605 of the frame of tool 600, which is modified accordingly.

Figure 7:
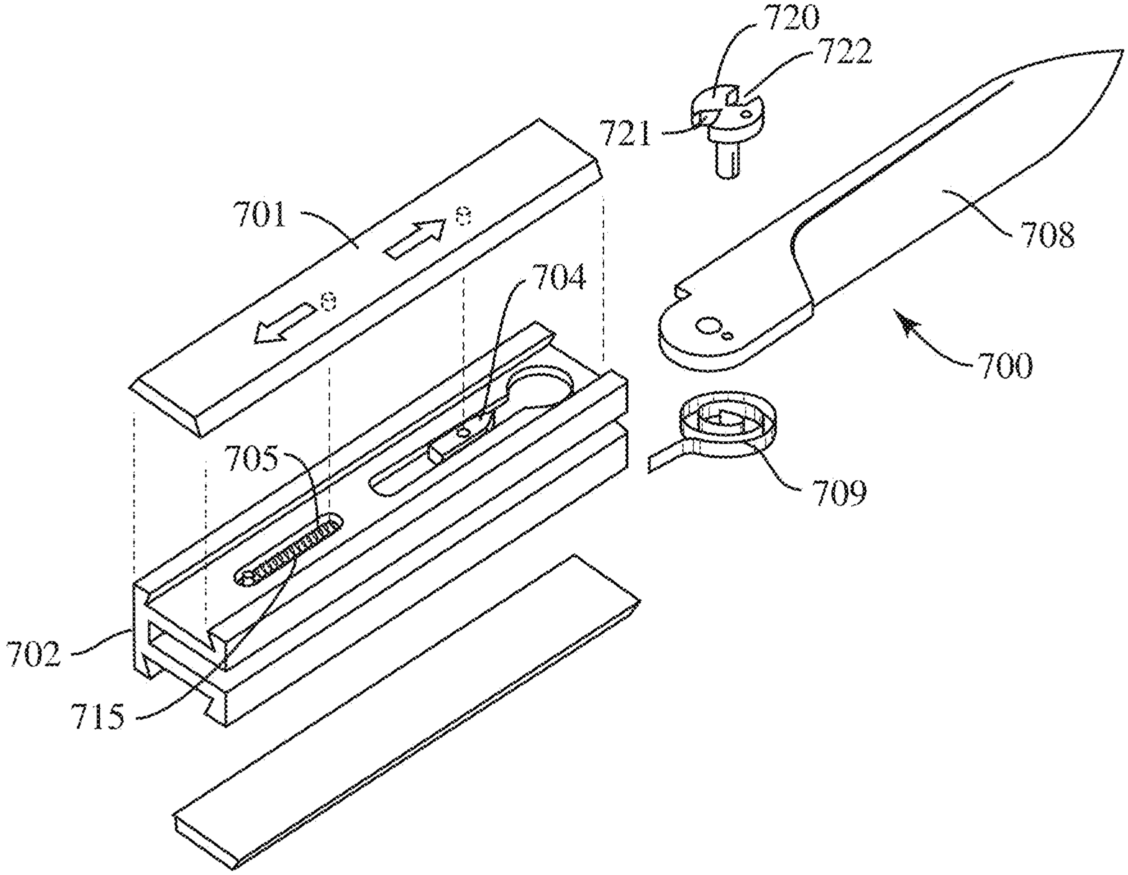
FIG. 7 is an exploded perspective view of a tool in accordance with the invention in which a sliding scale is biased forward and the sear is coupled to the scale.

FIG. 7 depicts an exploded view of an automatically opening tool 700, in accordance with another embodiment of the invention, which is similar to tool 200. Rather than spring 5 directly urging sear 4 of tool 200 in the distal direction, a spring 705 is positioned in a groove 715 of a frame 702. An end of spring 705 is coupled to a post on an inside portion of a front scale 701. Spring 705 urges scale 701 in the distal direction. Scale 701 is coupled to a sear 704. Sear 704 engages symmetrically oriented V-shaped notches 721 and 722 on a step shaft 720. A kick spring 709 is coupled to and urges a blade 708 into an open configuration. Step shaft 720 is likewise coupled to blade 708 and operates similarly to tool 200.

Figure 8:
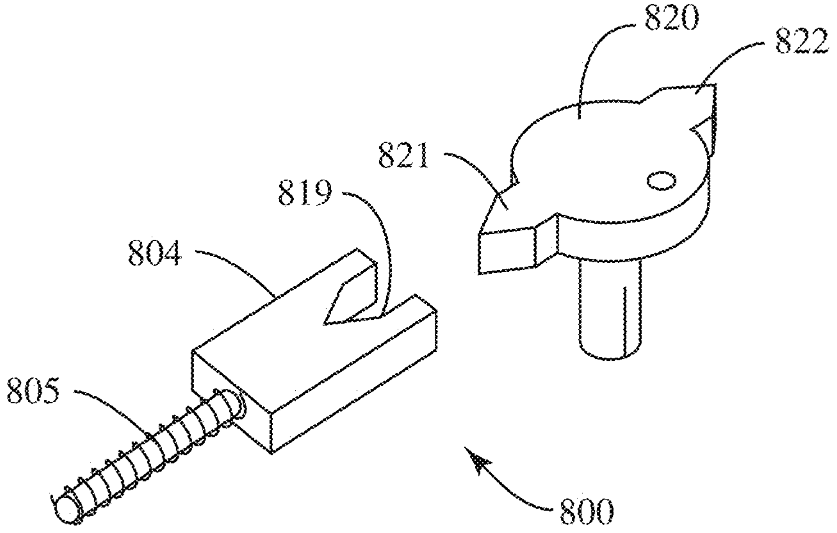
FIG. 8 is an exploded perspective view in accordance with the invention of a sear having a wedge receiving notch at its tip and a camming shaft having wedge projections for engaging the notch on the sear.

FIG. 8 depicts a step shaft 820 and a sear 804 of a tool 800 in accordance with another embodiment of the invention. Sear 804 receives a projection from the step shaft 820, which is the opposite of the arrangement of tool 200. Otherwise, the configuration can be similar to tool 200. Sear 804 is urged in the distal direction, towards step shaft 820 with a compression spring 805, similar to the construction of tool 200. Rather than having a chisel point, sear 804 has a V-shaped notch 819. Step shaft 820 is similar to step shaft 20, but rather than having a pair of V-shaped notches 21 and 22, step shaft 820 includes a pair of wedge shaped projections 821 and 822. Thus, this embodiment of the invention functions similarly to tool 200, except that the relative positions of the chisel point wedge shaped tip and the V-shaped notches are switched.

Figure 9:
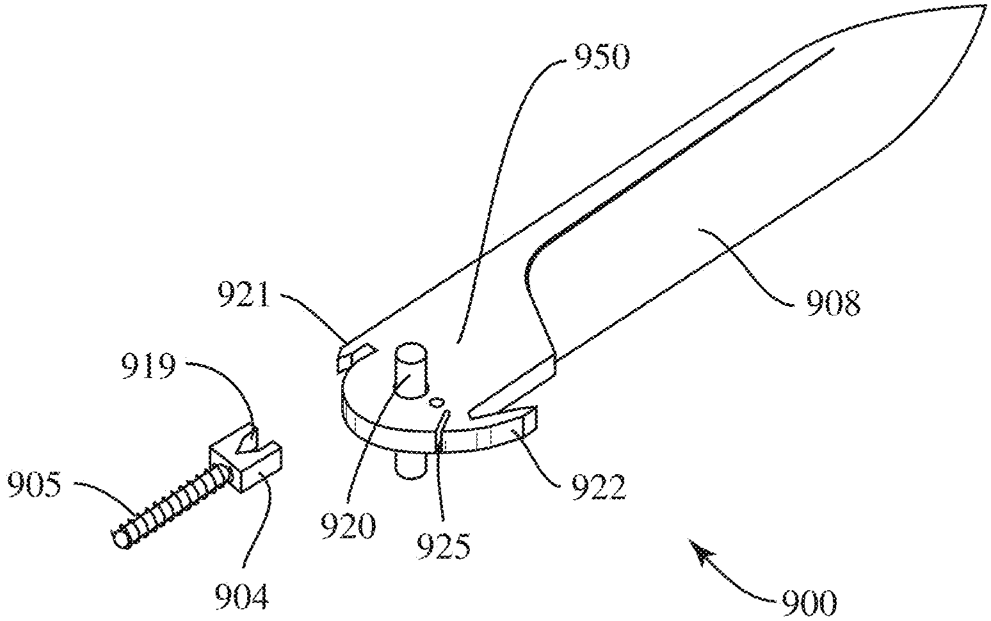
FIG. 9 is an exploded perspective view of a tool having a sear with a wedge receiving notch at its tip and a knife blade having wedge shaped projections extending from the blade base, for engaging the tip of the sear in accordance with the invention.

In accordance with yet another embodiment of the invention, FIG. 9 depicts a tool 900 having a north/south sliding scale activation in the form of a blade 908, which functions similarly to blade 608 and has an overall construction similar to tool 600. However, rather than including notches 621 and 622, blade 908 includes a pair of projections 921 and 922 formed into a base 950 of tool 908, to engage with a V-shaped notch 919 of a sear 904. Sear 904 is urged in the distal direction by a coil spring 905. Blade 908 pivots about an axle 920, which is similar to axle 620. Blade 908 includes a cut 925, which can engage an end of a kick spring (not shown). As with tool 200 or 600, to open or close blade 908 moving the scale of tool 900 along the longitudinal axis causes sear 904 to move longitudinally in the proximal direction to disengage either projection 921 or 922 from notch 919. If blade 908 is closed, the kick spring will urge blade 908 into the open configuration or it can be swung open manually. If blade 908 is open, it can be closed manually.

Figure 5:
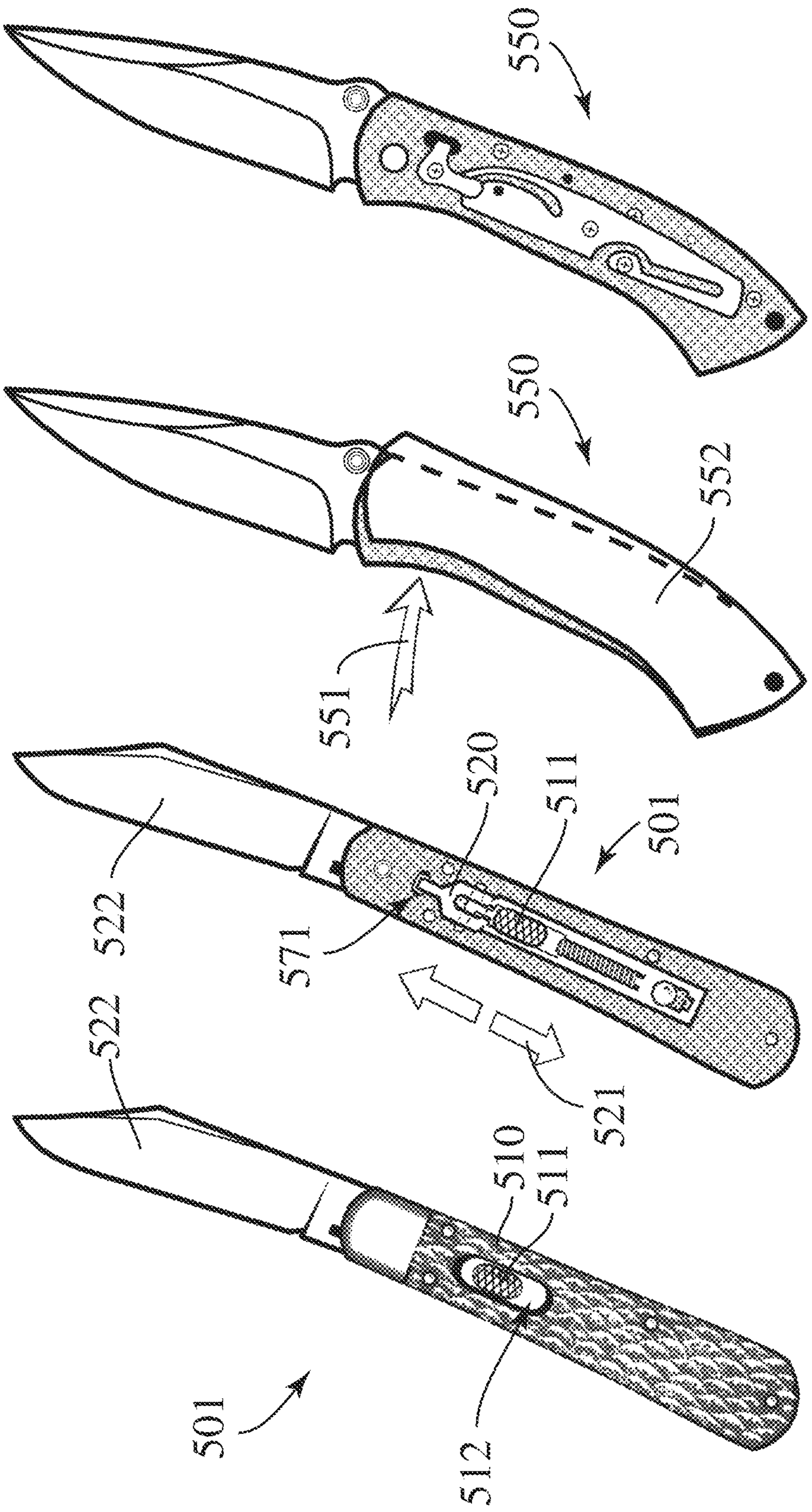
FIGS. 5*a*-5*d* are side views of prior art knives

As discussed above, FIGS. 5*a* through 5*d* depicts conventional automatically opening tools. FIG. 5*a* depicts knife 501 that is opened by activating button 511. In another embodiment of the invention, a knife similar to knife 501 can be constructed, without opening 512 and with activation button 511 attached to an inside surface of scale cover 510. By constructing knife 501 so that scale cover 510 can slide along the longitudinal axis, the knife can be opened and closed with a north/south sliding scale configuration. Similarly, those of ordinary skill in the art will understand how the activation mechanism of knife 550 can be converted to one activated by sliding the scale along the longitudinal axis.

Figure 10:
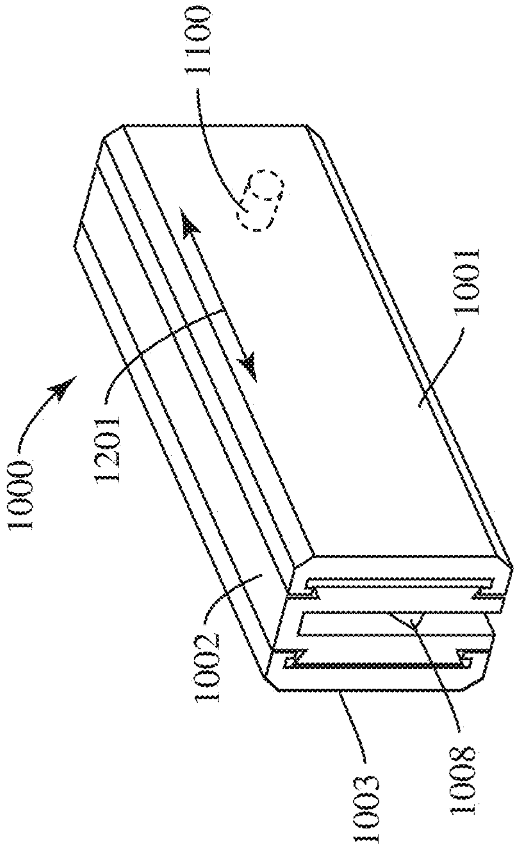
FIG. 10 is a perspective view of a tool in accordance with an embodiment of the invention, in which the tool opens out-the-front, in the closed, retracted configuration.

Activation mechanisms in accordance with the invention can also be used with out-the-front opening tools. FIG. 10 depicts an automatically opening out-the-front knife 1000. Knife 1000 includes a blade 1008 within a frame 1002. A pair of scales 1001 and 1003 of the same height as frame 1002 are mounted on the sides of frame 1002. Scales 1001 and 1003 cover frame 1002 from the horizontal perspective. Front cover 1001 can slide along the longitudinal axis in the direction of an arrow 1201. Front cover 1001 includes a peg 1100 which is coupled to activate the conventional out-the-front opening mechanism, modified to be activated by sliding scale 1001. Knife 1008 includes any of various known out-the-front opening mechanisms (not shown) on frame 1002, in which an activation switch is reciprocated along the north/south longitudinal axis. Out-the-front knives typically have an internal extension mechanism to bias the tool both from a closed configuration to an open, extended configuration. They typically also have a retraction mechanism to bias the tool from an open, extended configuration to a closed, retracted configuration. Such extension and retraction mechanisms are well known in the art. Thus, unlocking a closed tool can automatically extend it to the open configuration and unlocking an open tool can automatically retract it to a closed configuration. Both can be accomplished with sliding scale activation in accordance with the invention.

Figure 11:
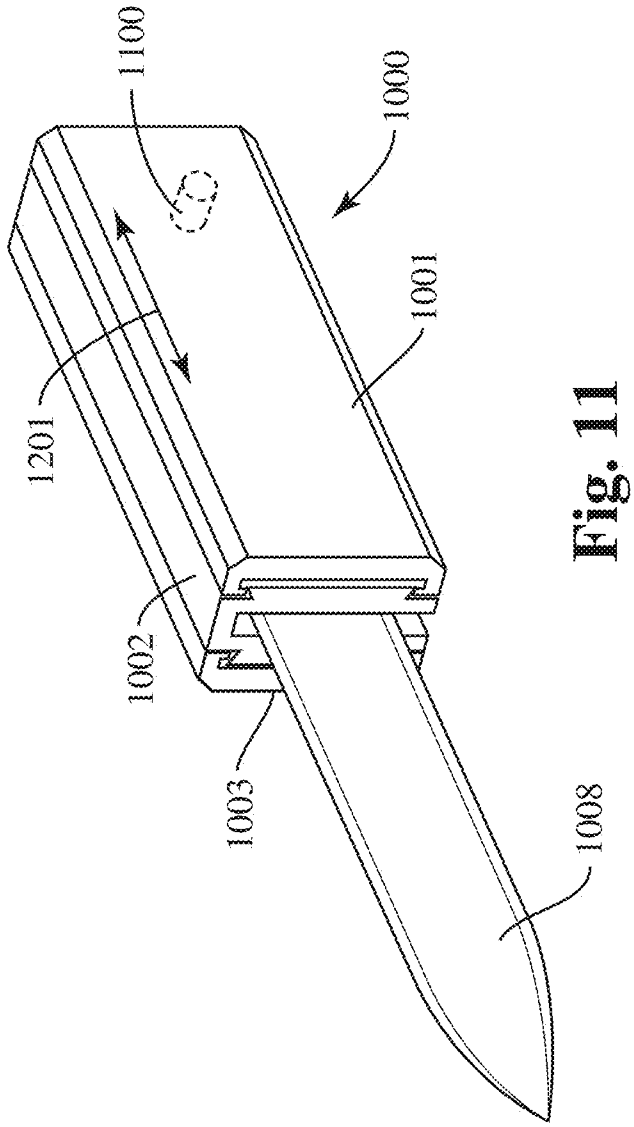
FIG. 11 is a perspective view of the tool of FIG. 10 in an open, extended configuration.

U.S. Pat. No. 7,562,455, the contents of which are incorporated herein by reference, in their entirety, depicts and out-the-front opening knife. The knife is activated by reciprocating a button exposed on the outside of the front cover to automatically extend the blade. Activating an extended knife will automatically retract the blade. The activation mechanism of knife 1000 is activated by sliding scale 1001 along the longitudinal axis to cause peg 1100 (or a different type of structure apparent to those skilled in the art) to either cause blade 1008 to extend into the open configuration of FIG. 11 or to cause knife 1000 to retract to the closed configuration of FIG. 10.

FIG. 12 depicts the frame and scale covers of an automatically opening tool 1200, in accordance with an embodiment of the invention, similar to knife 200. Knife 1200 includes a frame 1202 with a left side front scale receiving groove 1202*a* and a right side rear scale receiving groove 1202*b*. A left scale 1201 is slidingly engaged in left groove 1202*a* and a right scale 1203 is removably fixed in right groove 1202*b*. Left and right scales 1201 and 1203 cover most, but not all of the respective left and right sides of frame 1202.

Grooves 1202*a* and 1202*b* act as female receptacles for scales 1201 and 1203. Thus, they cover most of the left and right sides of frame 1202, but do not cover the entire left and right sides. Scales 1201 and 1203 have a trapezoidal cross section, with a wider inside base portion facing frame 1202 and a cavity therein and a more narrow outside surface facing outward from the central cavity. The outer edges of groove 1202*a* and 1202*b* are angled inward, to retain scales 1201 and 1203 to frame 1202.

FIG. 13 depicts the scales and frame of an automatically opening tool in the form of a knife 1300 in accordance with another embodiment of the invention. Knife 1300 includes a frame 1302 having a left wall 1302*a* and a right wall 1302*b* defining a blade well cavity 1311 therebetween. A left scale 1301 is slidingly mounted on left wall 1302*a*. A right scale 1303 is releasably fixedly mounted on right wall 1302*b*. Left and right walls 1302*a* and 1302*b* each include a projecting retention rib 1350. Left and right scales 1301 and 1303 each include a retention groove 1360. Retention ribs 1350 are received in retention grooves 1360, to hold scales 1301 and 1303 to frame 1302. Retention ribs 1350 have flared edges, which extend outward (up and down) from walls 1302*a* and 1302*b*. Retention grooves 1360 are defined by the edges of scales 1301 and 1303, which are flared inwardly. Thus, scales 1301 and 1303 can substantially cover the entire sides of frame 1302.

FIG. 14 depicts the scales and frame of an automatically opening tool in the form of a knife 1400 in accordance with another embodiment of the invention. A frame 1402 of knife 1400 is similar in structure to frame 1302 and includes a left wall 1402*a* and a right wall 1402*b*, defining a blade well cavity 1411 therebetween. A left scale 1401 is slidingly mounted on left wall 1402*a*. A right scale 1403 is releasably fixedly mounted on right wall 1402*b*. Left and right walls 1402*a* and 1402*b* each include a projecting retaining rib 1450. Left and right scales 1401 and 1403 each include a retention groove 1460. Retaining ribs 1450 are received in retention grooves 1460, to hold scales 1401 and 1403 to frame 1402. Retaining ribs 1450 have flared edges, which extend outward and upward down from walls 1402*a* and 1402*b*. Retention grooves 1460 are defined by edges 1461, which extend inward towards each other.

The edges of scales 1301 and 1303 are angled, to match the angled flare of retaining ribs 1350. This provides a close tolerance, but can be difficult to machine. Edges 1461 of scales 1401 and 1403 can be squared off. This can be easier to machine, but provides a looser fit. However, it can provide more sliding friction.

Figure 16:
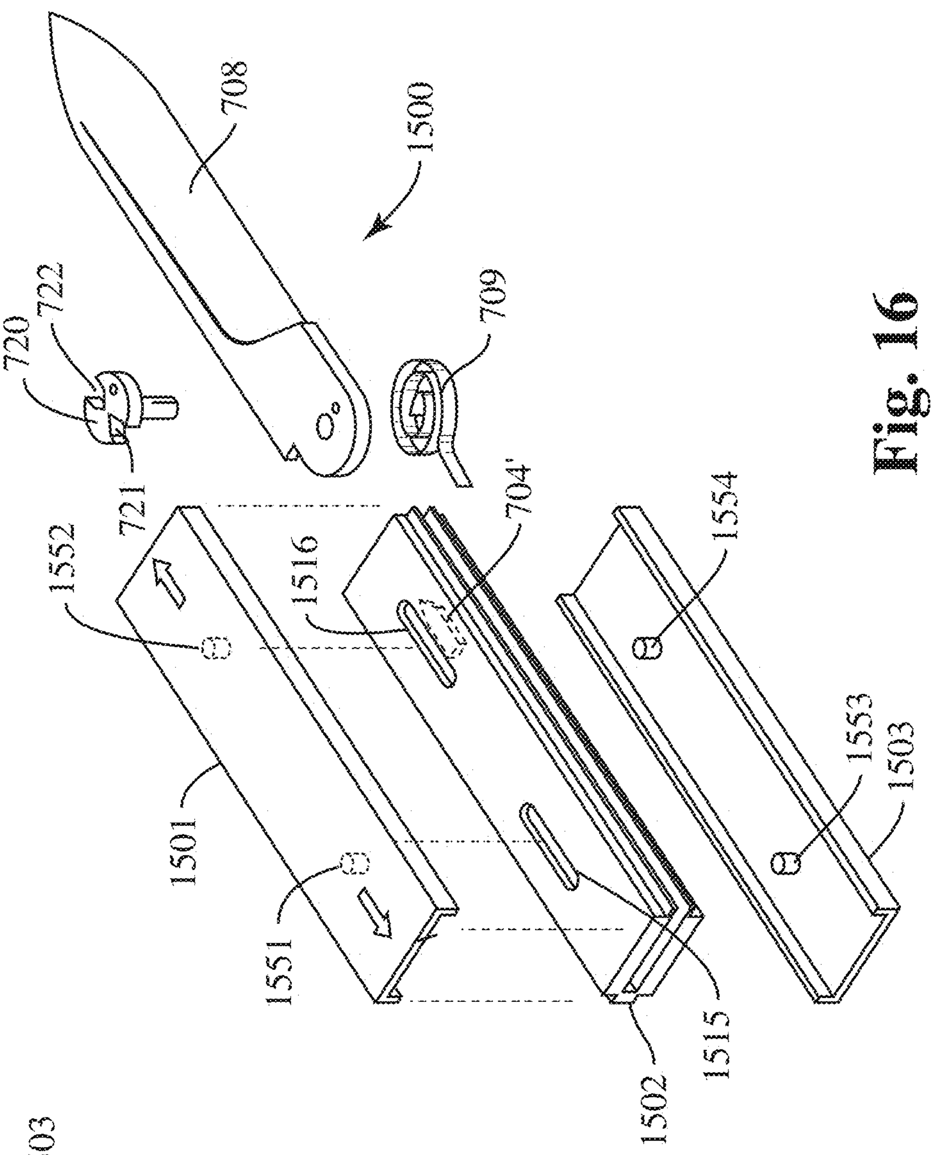
FIG. 16 is an exploded perspective view of a lockable tool in accordance with an embodiment of the disclosure.
Figure 15:
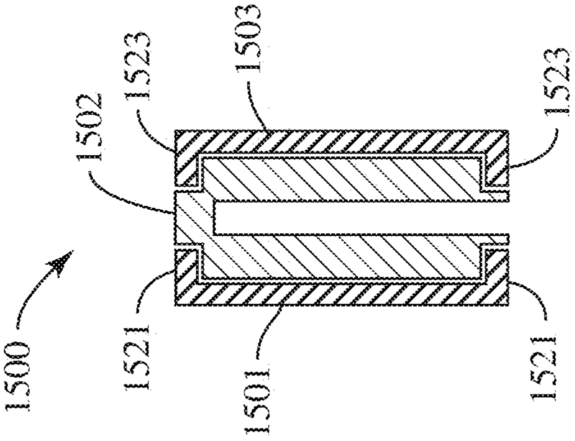
FIG. 15 is a cross-sectional end view of a tool in accordance with another embodiment of the disclosure.

An automatically opening tool 1500, in accordance with another embodiment of the invention, is shown in FIGS. 15 and 16. Tool 1500 is similar to tool 700, shown in FIG. 7. However, the scales are not retained to the frame in a nesting engagement, as with tool 700. Automatically opening tool 1500 includes a frame 1502, with a first scale 1501 and a second scale 1503, mounted on opposite sides thereof. Scales 1501 and 1503 enclose the outward facing sides of frame 1502. A pair of top and bottom edges 1521 of first scale 1501 and a pair of top and bottom edges 1523 of second scale 1503 are not entrapped by, nor do they entrap any portions of frame 1502. Rather, the top and bottom outside edges of frame 1502 are notched; top and bottom edges 1521 and 1523 of scales 1501 and 1503 are at right angles to the sides of scales 1501 and 1503; and top and bottom edges 1521 and 1523 merely ride against frame 1502. There is no interaction between frame 1502 and edges 1521 and 1523 to retain scales 1501 and 1503 to frame 1502. Scales 1501 and 1503 ride over the sides of frame 1502 as a free cap or cover.

Automatically opening tool 1500 includes knife 708, spring 709 and notched shaft 720, as in tool 700. However, the nature and arrangement of sear 704 and spring 705 are modified, as are the slots in which they are positioned. Scale 1501 includes a rear attachment member 1551, which can be a post, hook, wire, or otherwise. Rear attachment member 1551 extends through a slot 1515 in frame 1502 and can attach to a spring, which urges scale 1501 in the distal, forward direction or to a corresponding member to secure scale 1501 in sliding engagement against frame 1502. A forward attachment member 1552 extends through a forward slot 1516 in frame 1502 and can attach to a sear 704', which can be similar to sear 704. Alternatively, sear 704' can be coupled to a spring, similar to sear 4 of FIG. 1. Because rear slot 1515 and forward slot 1516 are narrow, the attachment of scale 1501 through these slots retains scale 1501 in sliding engagement to frame 1502. Members 1553 and 1554 can be used to secure scale 1503 to frame 1502. As will be apparent to those familiar with the art, other arrangements with a cap-like scale that covers substantially all the sides of the frame and exposes substantially none of the frame sides is also acceptable.

Figure 17:
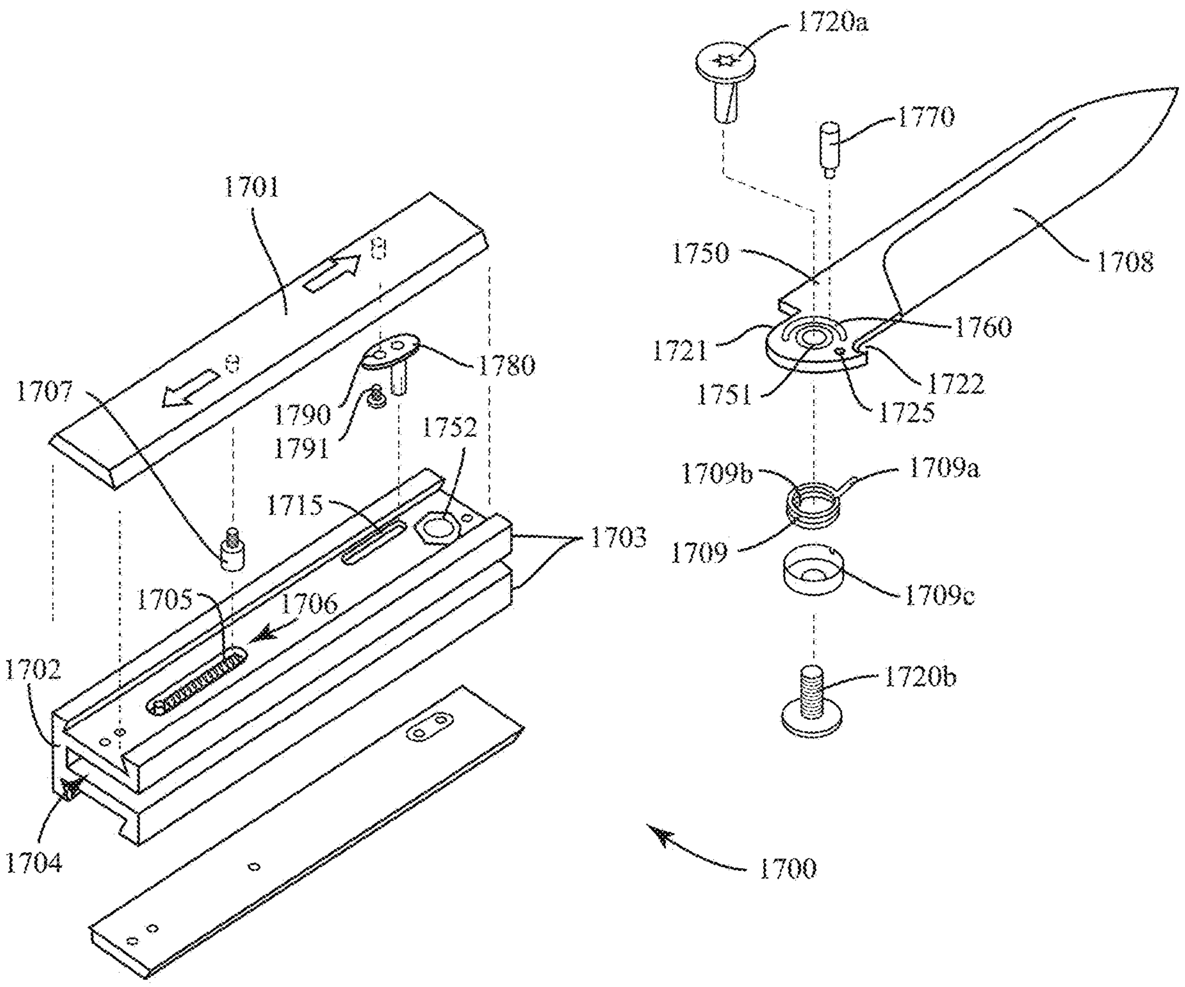
FIG. 17 is an exploded perspective view of a lockable tool, in the form of a knife, with a north-south sliding scale release, according to an embodiment of the present disclosure.
Figure 18:
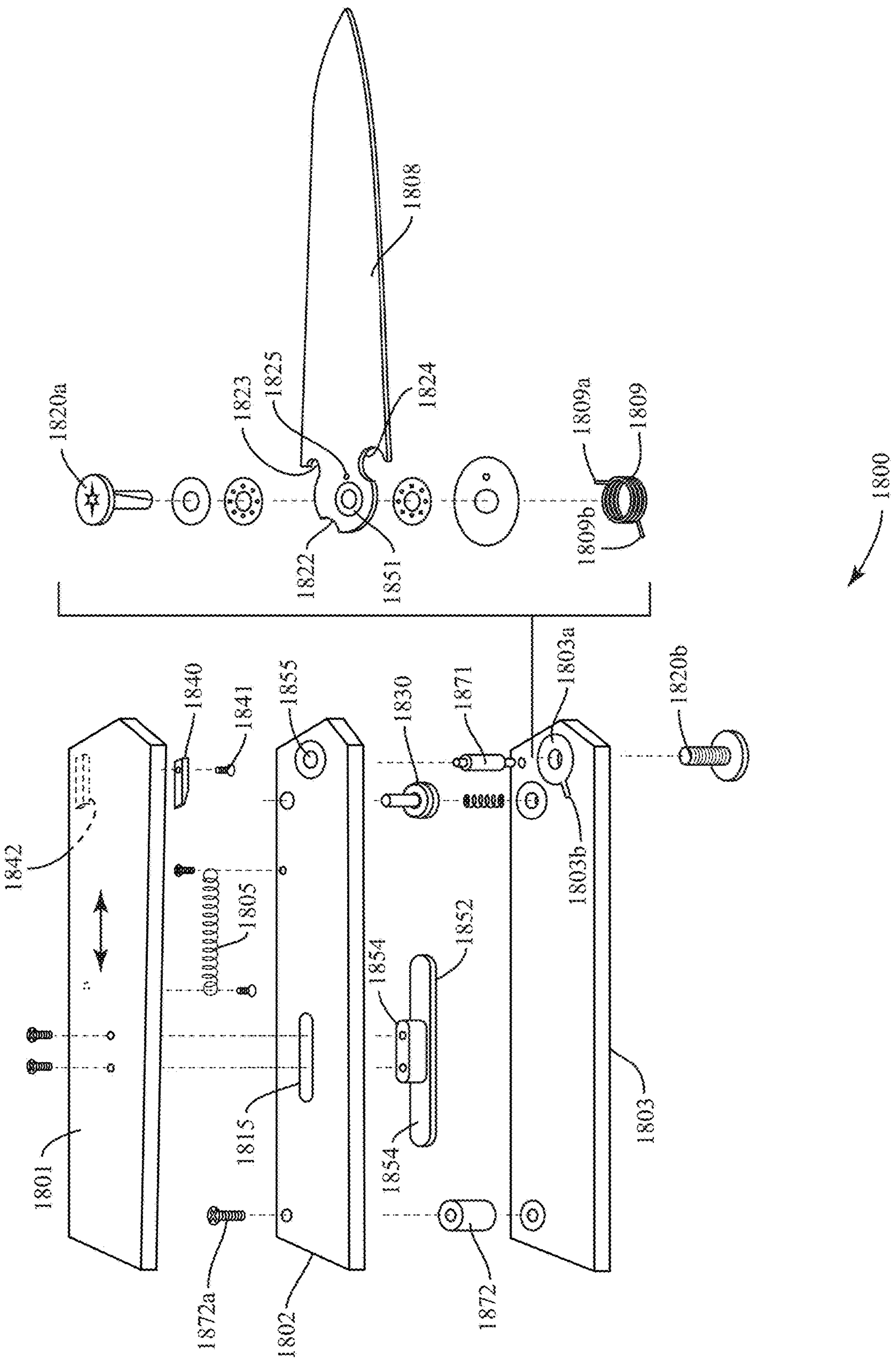
FIG. 18 is an exploded perspective view of a lockable tool, in the form of a knife, with a north-south sliding scale release, in accordance with another embodiment of the disclosure.

FIG. 17 depicts a selectively lockable tool 1700, in accordance with still another embodiment of the invention. Tool 1700 is similar to tools 600 and 900, in that a base 1750 of a blade 1708 comprises a portion of the locking and release mechanism. Tool 1700 includes a U-shaped frame 1702, with a pair of sidewalls 1703, that can be similar to the frames of the other embodiments of the invention. Frame 1702 can be unitary or assembled from multiple pieces. Sidewalls 1703 form a tool receiving slot 1704 therebetween.

In a retracted configuration, blade 1708 is received within slot 1704 and pivotably coupled to frame 1702 with a shaft 1720. Base 1750 includes a shaft receiving through hole 1751. A complementary shaft receiving hole 1752 is formed through one or both sidewalls 1703. In one embodiment of the invention, shaft 1720 is formed as a two-piece shaft 1720*a* and 1720*b*. Portion 1720*a* is preferably a keyed pivot barrel, with portion 1720*b* as a complementary pivot screw. Together, they act to pivotably secure blade 1708 to frame 1702.

Base 1750 includes a groove 1760 formed therethrough. A stop pin 1770 is positioned through groove 1760 and is located between walls 1703 of frame 1702. Groove 1760 is partially circular, and concentric with hole 1751 through base 1750. Thus, as blade 1708 extends and retracts between the open and closed positions, stop pin 1770 rides in groove 1760. The ends of groove 1760 act to stop blade 1708 from further rotation and help properly position blade 1708 in the retracted or extended configurations.

Tool 1700 includes an optional and removable coil spring 1709, which can be located around shaft 1720. Coil spring 1709 includes a first end 1709*a*, which is received in a corresponding hole in frame 1702, to secure spring 1709 to frame 1702. A second end 1709*b* is received in a hole 1725 through base 1750. Spring 1709 can be enclosed in a pair of cap/bushings 1709*c*. The second half of the pair may be placed on the other side of blade 1708 (not enclosing spring 1709), in order to ensure centered alignment of blade 1708 in channel 1704. In another embodiment of the invention, spring 1709 is removed and tool 1700 is opened manually, such as with a flick of the wrist. In another embodiment of the invention, spring 1709 is removed or replaced, as desired, to switch tool 1700 between an automatically opening tool, and a manually opening tool. One or more washers (not shown) can be used to take the position of spring 1709 if said spring is not included.

At least one of the walls 1703 of frame 1702 includes a spring receiving slot 1706. A compression spring 1705 resides in slot 1706. A pin 1707, which can be in the form of a torx screw secured to an inside surface of scale 1701, rides in slot 1706. An inward end of pin 1707 extends into slot 1706 and is biased in the forward position by spring 1705. In this manner, because pin 1707 is secured to scale 1701, spring 1705 biases scale 1701 to the forward position. However, scale 1701 can be manually slid rearwards along the longitudinal axis against the force of spring 1705 to unlock tool 1700.

With blade 1708 in the locked, extended configuration, a release pin 1780 interfaces with the flat tang catch surface as part of a notch 1721, thus preventing blade 1708 from rotating into the closed configuration. Release pin 1780 is secured to the inner surface of scale 1701. For example, pin 1780 can be in the form of a shaft extending from a base 1790. Base 1790 can fit into a recess formed in the inner surface of scale 1701 and can be secured with a torx screw 1791. To close tool 1700, scale 1701 is retracted rearwards along the longitudinal axis, which moves release pin 1780 rearwards, out of a position in notch 1721, where it had locked blade 1708 in the open configuration, and blade 1708 can be rotated closed by hand. Release pin 1780 can slide forward into camming engagement against base 1750. As blade 1708 rotates further, pin 1780 will slide into a second groove/notch 1722 in base 1750, to lock blade 1708 in a closed configuration.

To unlock blade 1708, scale 1701 is slidingly retracted against the forward force of spring 1705, which retracts release pin 1780 out of notch 1722. In the manual embodiment, blade 1708 can be swung out of slot 1704, into the open configuration, wherein pin 1780 can be locked into notch 1721. In the automatic embodiment, spring 1709 biases blade 1708 into the open configuration and pin 1780 can ride against or behind base 1750 until scale 1701 is released and locks pin 1780 into notch 1721.

Still another embodiment of the invention is shown in FIGS. 18-24, as an automatically opening tool 1800 in the form of an automatically opening knife. Tool 1800 is formed with three parallel plates: a right-side plate 1801, a middle plate 1802 and a left-side plate 1803. Optional decorative scales can be used to cover the outside surfaces of plates 1801 and 1803. As with previously described embodiments, the release mechanism of this embodiment can be used to unlock a blade that pivots into the extended configuration or an out the front knife that extends longitudinally to the extended configuration. The pivoting embodiment is disclosed in FIGS. 18-24. However, those of ordinary skill in the art will also readily appreciate how the release mechanism can be used to unlock an out the front mechanism.

Middle plate 1802 includes a main slot 1815 along a longitudinal front-to-rear (North-South) axis of plate 1802 and tool 1800. A retention slide 1852 extends from the left-side to the right-side of main slot 1815. Retention slide 1852 includes a retention head 1853 that is shorter than the length of slot 1815, so that it can slide forward and rearward in slot 1815. Retention slide 1852 also includes retention wings 1854, which are longer than the length of slot 1815 and ride on the left side of middle plate 1802, outside slot 1815. Retention head 1853 is secured to front scale 1801, such as with one or more screws.

In this manner, right-side plate 1801 is secured to middle plate 1802 and is displaceable in the forward and rearward directions with respect to middle plate 1802, as retention slide 1852 is moved forward and rearward in slot 1815. A spring 1805 is secured to both middle plate 1802 at one end, and right-side plate 1801 at its other end, to bias right-side plate 1801 in the forward direction with respect to middle plate 1802. However, a user can easily slide right-side plate 1801 rearwards with respect to plate 1802 with even a subtle hand gesture, such as by applying thumb pressure.

Middle plate 1802 is secured to left-side plate 1803. A front spacer 1871 and a rear spacer 1872 are used to provide a gap between middle plate 1802 and left-side plate 1803. A screw **1872*a* can be used to secure the rear end of middle plate 1802 two left-side plate 1803**.

A tool, such as a knife blade 1808 can be pivotably secured within the gap between middle plate 1802 and left-side plate 1803. A kick spring 1809 can be used to bias knife 1808 into the extended condition. Plate 1803 can be formed with a recess **1803*a* to receive spring 1809. Recess 1803 a can include a slot 1803*b* to receive a foot 1809*b* of spring 1809, to prevent spring 1809 from rotating with respect to plate 1803. Blade 1808 includes a hole 1825 to receive an arm 1809*a* of spring 1809, to impart rotational force to blade 1808**.

Plate 1808 is secured in the gap between plates 1802 and 1803 in the following manner. A rotation hole 1851 is provided through the tang of blade 1808. The female part of a tube nut 1820 extends from right-to-left through a hole 1855 through middle plate 1802, and then through tang hole 1851. A male portion tube bolt **1820*b* extends from left-to-right, through plate 1803, where it is received by tube-nut 1820*a*. An assembly of washers and bearings is used to promote smooth movement as blade 1808 is swung between a retracted and an extended configuration. In this manner, spring 1809 biases blade 1808 out of the gap between plates 1802 and 1803, into the extended configuration. The washers and bearings retain spring 1809 and blade 1808** in place, while promoting smooth movement.

Figure 19:
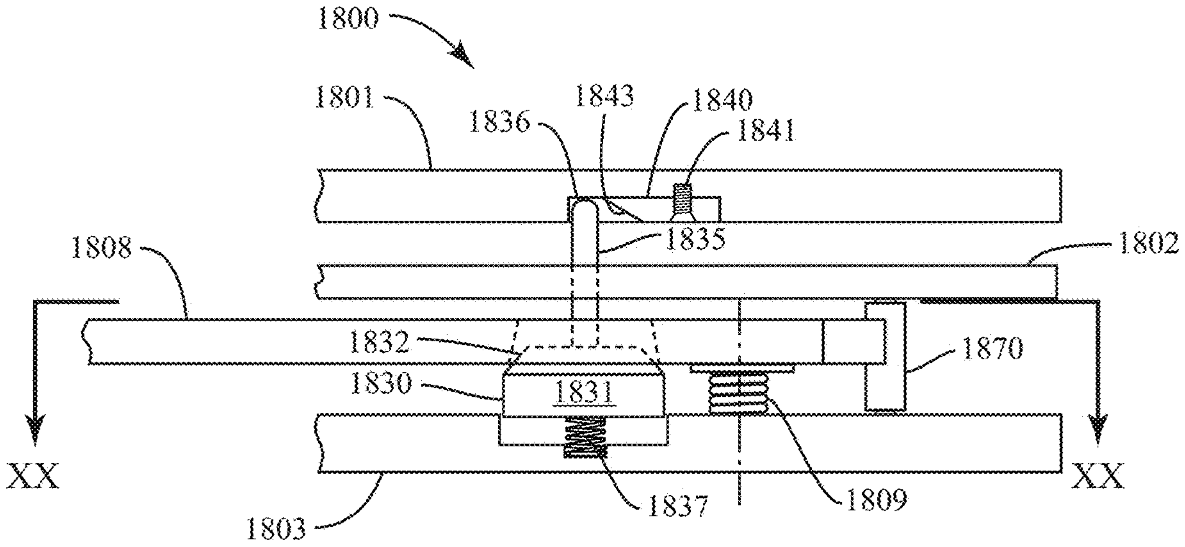
FIG. 19 is a partial bottom view of the tool of FIG. 18, in a retracted and locked condition.
Figure 20:
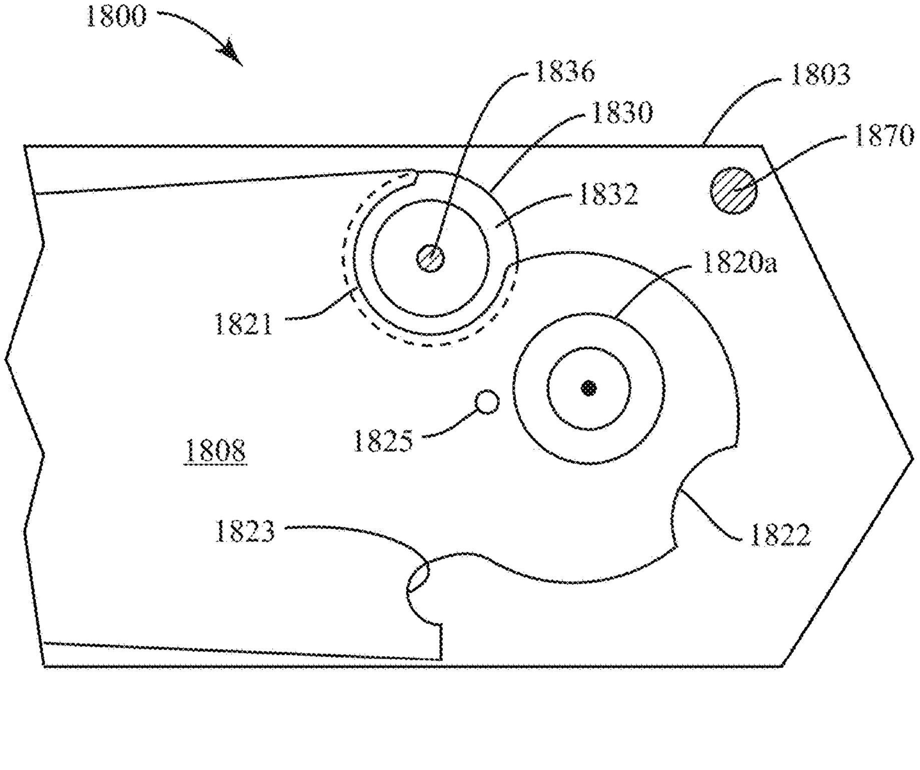
FIG. 20 is a partial side view of the tool of FIG. 18, in a partially extended condition, taken along line XX of FIG. 19.

A spring-loaded plunger-shaped mechanism 1830 for locking and unlocking blade 1808 in either the extended or retracted configurations is depicted most clearly in FIGS. 19-24. Referring to first to FIG. 19, plunger 1830 includes a base 1831 and a rod 1835 extending from base 1931. Rod 1835 includes a dome-shaped or otherwise inclined top 1836. Base 1831 includes an inclined locking portion 1832 having a decreasing diameter as it extends from base 1831. In the locked, retracted configuration, top 1836 of base 1831 nests in a circular notch 1821 formed through the tank of blade 1808. To unlock and extend blade 1808, base 1831 of plunger 1830 is disengaged from notch 1821 of blade 1808, as described below.

Figure 21:
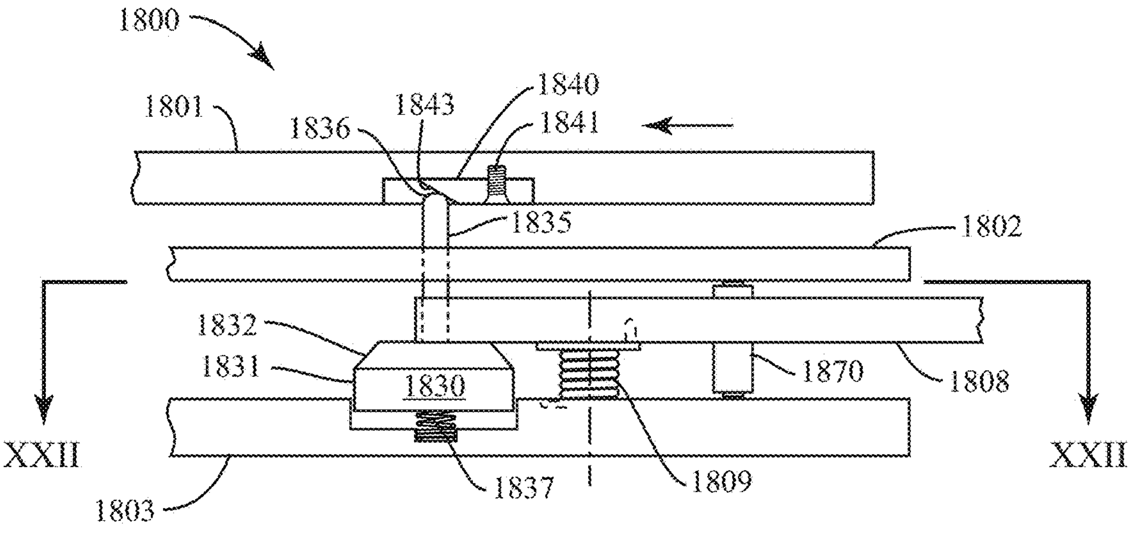
FIG. 21 is a partial bottom view of the tool of FIG. 18 in a partially extended condition.
Figure 22:
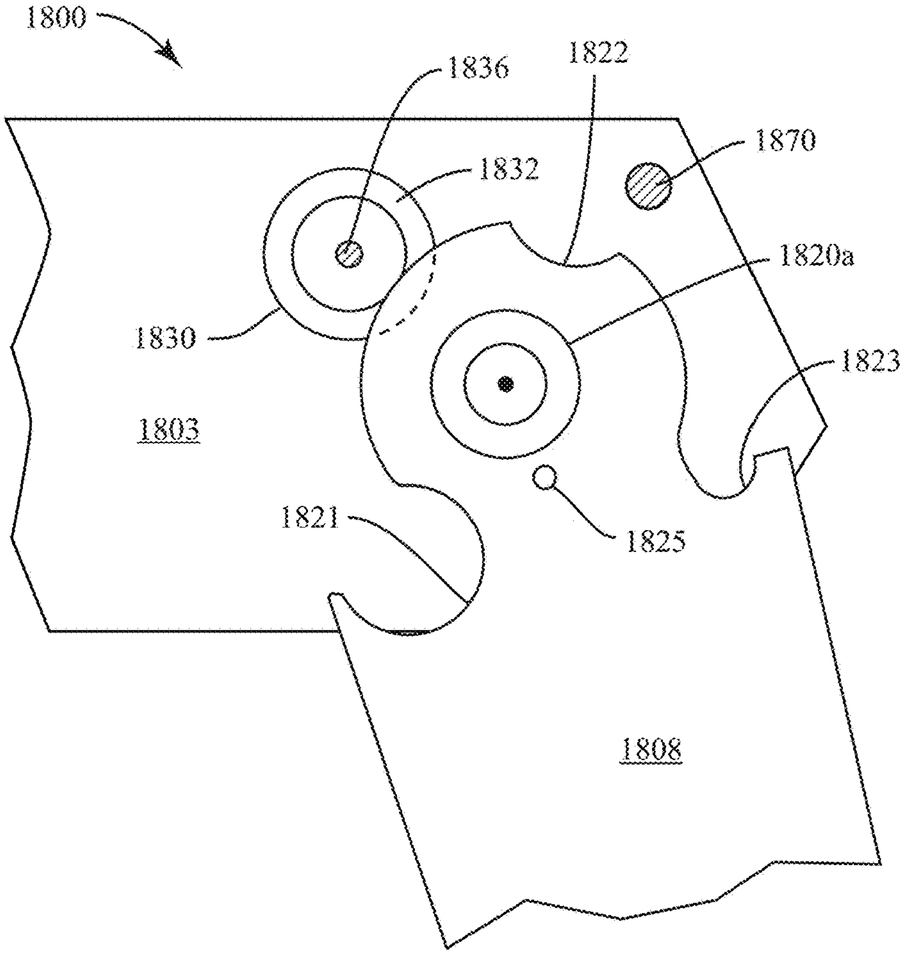
FIG. 22 is a partial side view of the tool of FIG. 18 in a partially extended condition, taken along line XXII of FIG. 21.

A spring 1837 biases plunger 1830 in an extended condition from left-to-right. A wedge-shaped activation button 1840 with an inclined surface 1843 for contacting dome 1836 at the rightmost end of rod 1835 is secured in a recess 1842 in an inside surface of right side plate 1801. Alternatively, plate 1801 can be formed with a corresponding integral structure having the inclined surface. As right-side plate 1801 is slid rearward with respect to plates 1802 and 1803, inclined portion 1843 of button 1840 rides on dome 1836, and urges plunger 1830 towards left-side plate 1803. This causes locking portion 1832 to recede from notch 1821, such that plunger 1836 no longer prevents spring 1809 from rotating blade 1808 into the open condition, as shown in FIG. 21.

Figure 23:
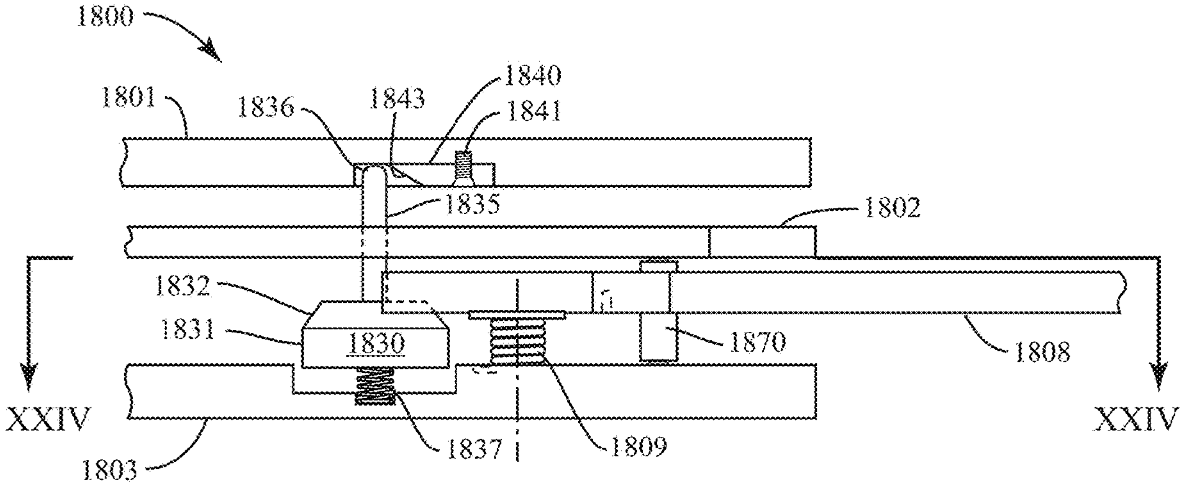
FIG. 23 is a partial bottom view of the tool of FIG. 18, in a locked, extended condition.
Figure 24:
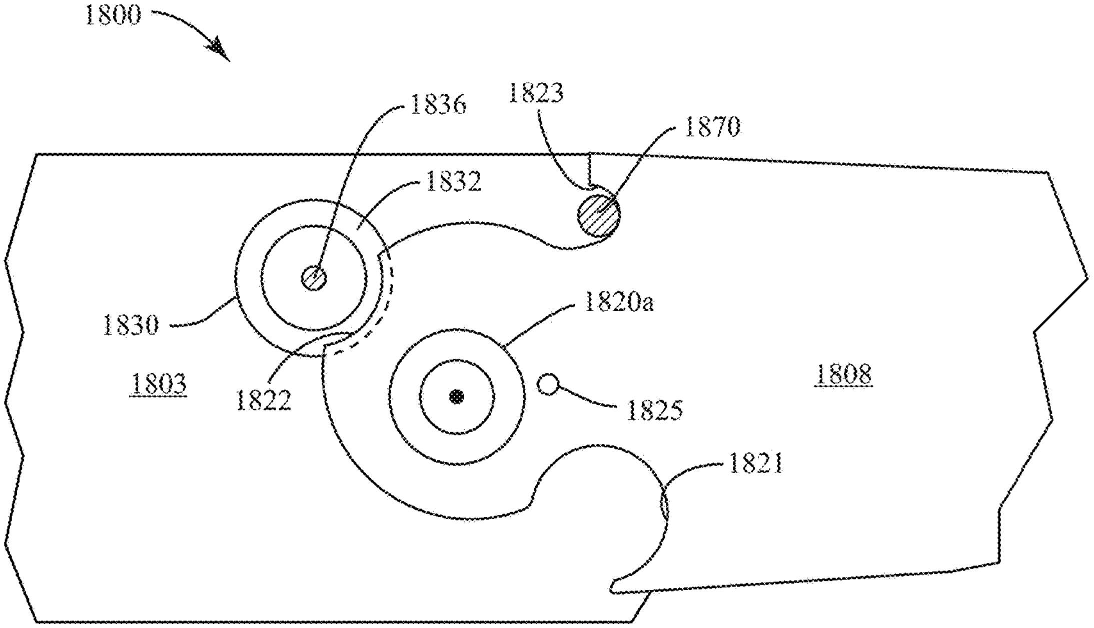
FIG. 24 is a partial side view of the tool of FIG. 23, in a locked, extended condition, taken along line XXIV of FIG. 23.

Referring now to FIGS. 23 and 24, blade 1808 will continue to rotate, until a stop groove 1823 in the tang of blade 1808 meets stop member 1871. Simultaneously, a security groove 1822 in the tang of blade 1808 permits plunger 1830 to re-extend in the right-side direction, as inclined portion 1832 nests into security groove 1822. In this condition, blade 1808 is maintained in a locked, extended position.

To unlock blade 1808 and return blade 1808 into the retracted condition, first, right-side plate 1801 is slid rearward. This causes ramp 1843 of button 1840 to depress plunger 1830, and withdraw locking section 1832 from security groove 1822. A user can then rotate blade 1808 back into the retracted configuration, against the bias of spring 1809. Once the retracted condition is reached, locking portion 1832 once again extends into notch 1821, to lock blade 1808 in the closed, retracted configuration.

In the retracted condition, locking portion 1852 nests into notch 1821 in the tang of blade 1808. Notch 1821 is in the shape of a partially open circle. The opening is less than 180°, but more than 0°, which would be a closed circle. Preferred openings are about 160° to 20°, more preferably 150° to 30°. The diameter of the opening should be less than the diameter of plunger base 1831, but wider than the diameter of dome locking portion 1832, such that plunger can nest into opening 1821.

In preferred embodiments of the invention, the locking mechanism comprises a base having a projection with an inclined end. This inclined end is configured to nest in a corresponding groove in a base portion of the tool, such as in the tang of a knife blade. The base can be biased into the locking position. A rod can extend from the base. An inclined surface can be moved with respect to the rod, to depress the base in a direction opposite the locking position, to move the projection out of the groove. In the unlocked position, a biasing mechanism can automatically open the tool, or a user can manually close the tool.

Those of ordinary skill in the art will readily appreciate that the action of sliding the outer plate or scale of an out the front knife to depress a spring biased plunger, as described above, can activate an out-the-front release mechanism. Therefore, an out-the-front knife can be made with essentially the same release mechanism as described herein with reference to FIGS. 18-24.

Figure 25:
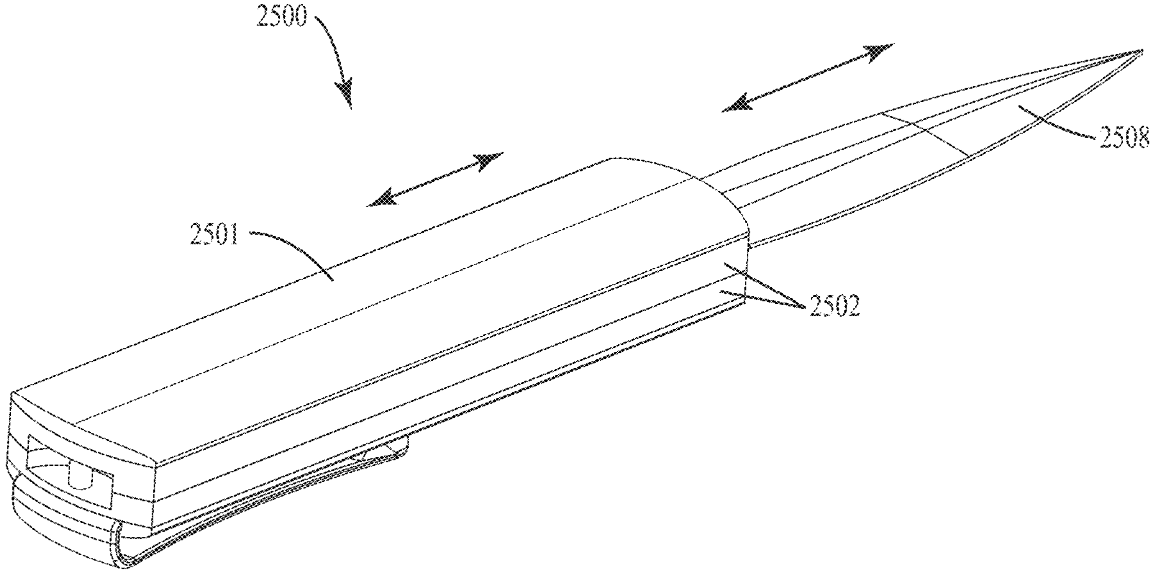
FIG. 25 is a perspective view of a lockable tool, in the form of an out-the-front knife with a north-south sliding scale release in accordance with an embodiment of the invention.
Figure 26:
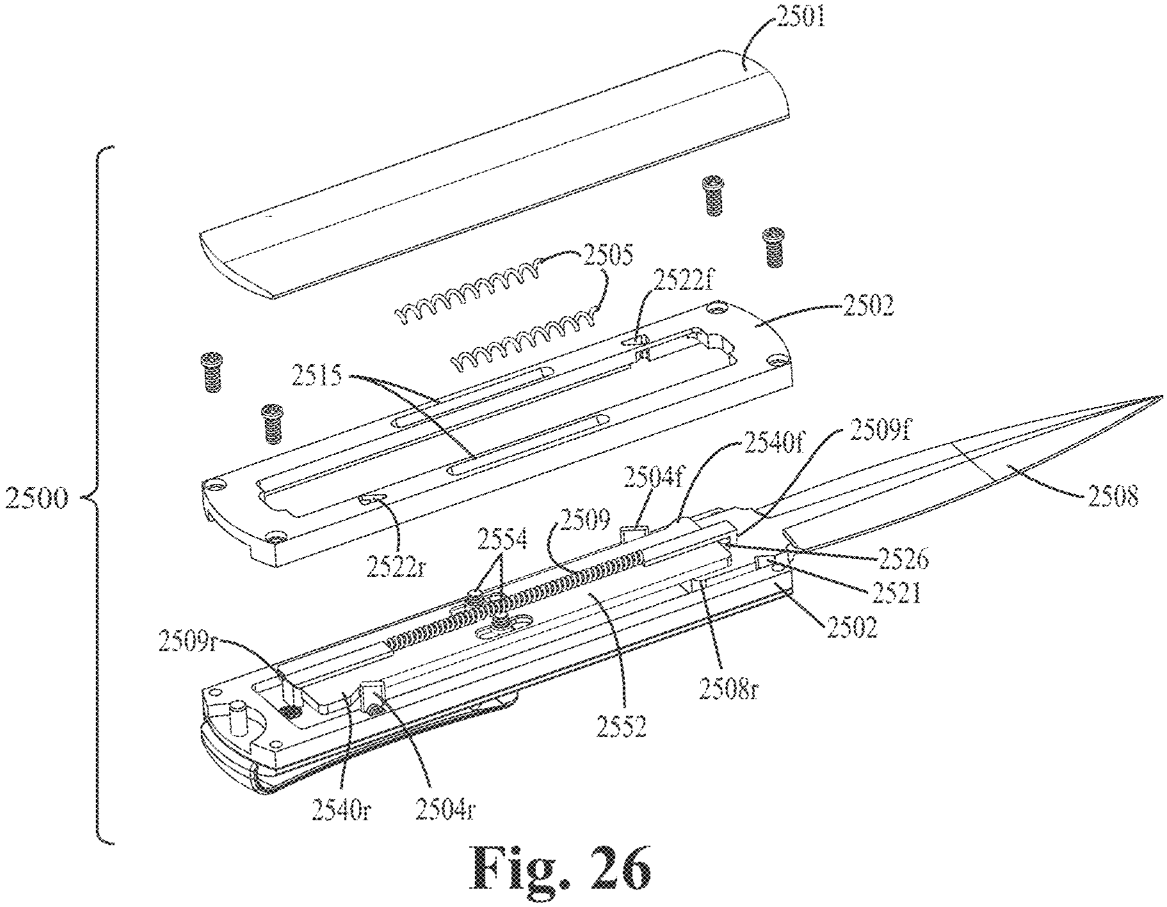
FIG. 26 is a partially exploded perspective view of the knife of FIG. 25.
Figure 27:
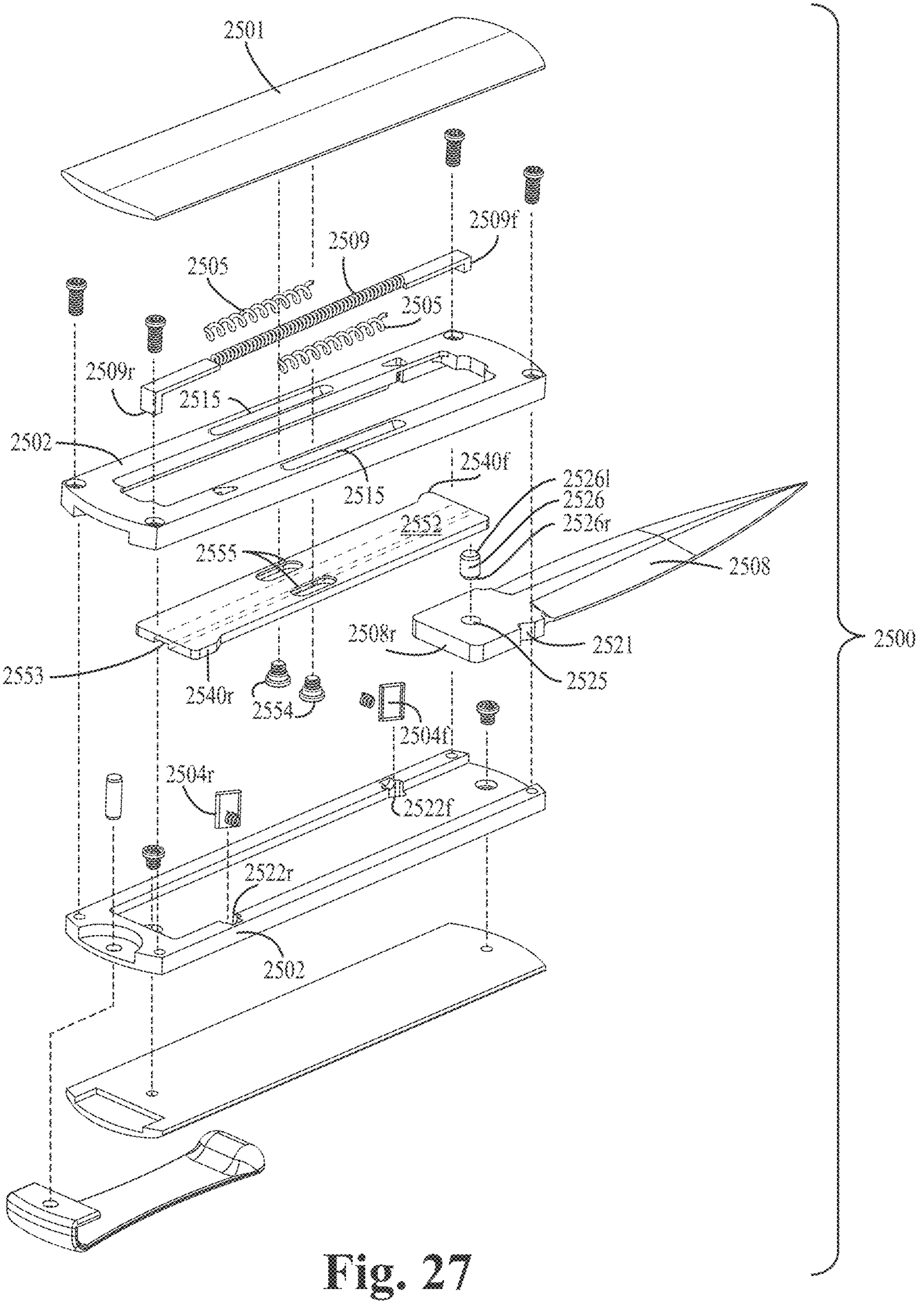
FIG. 27 is a more fully exploded perspective view of the knife of FIG. 25.

Referring now to FIGS. 25-27, another example of an automatically opening tool with forward-rear (north-south) sliding scale release activation is shown generally as an out-the-front knife 2500. Knife 2500 includes a blade 2508 mounted within a central frame 2502. Frame 2502 can be formed with a left half and a right half, held together with screws and the like. Frame 2502 includes a central recess between the left and right halves for receiving blade 2508 when in the retracted configuration. A center slide 2552 is also mounted in frame 2502, positioned to be at the left-side of blade 2508 when blade 2508 is in the retracted configuration, and engaged at a rear end 2508*r* of the tang of blade 2508, when blade 2508 is in the extended configuration. Center slide 2552 includes a slot 2553 extending between its front and rear edges, along the longitudinal axis of its right-side surface.

A left side sliding scale 2501 is coupled to a left side of center slide 2552, with a pair of screw bearings 2554, so that left scale 2501 and slide 2552 move as a unit. Bearing screws 2554 are received in screw receiving holes (not shown) on the right-side surface of left scale 2501. Screws 2554 extend through respective slots 2555 in center slide 2552, to permit slight play in moving left scale 2501 forwards or rearwards before the release mechanism is activated.

A pair of bias springs 2505 are provided in a pair of respective spring slots 2515 in the left half of frame 2502, to urge left scale 2501 back to center, after left scale 2501 is slid forwards or rearwards. Bias springs 2505 are thicker than the depth of spring slots 2515 and protrude out of slots 2515. The protruding portions of springs 2505 are received in a pair of scale slots (not shown) on the right-side surface of left scale 2501. Thus, left scale 2501 and therefore, center slide 2552 are biased in a centered position by the force of bias springs 2505. A user can slide left scale 2501 (and therefore, center slide 2552) forwards or rearwards along the north-south longitudinal axis of knife 2500, with respect to this centered position by manually overcoming the force of bias springs 2505. This slides center slide 2552 in the forward or rearward direction along the longitudinal axis of frame 2502. When left scale 2501 is released, bias springs 2505 will urge left scale 2501 back towards the centered position with respect to frame 2502.

Blade 2508 is coupled to center slide 2552 with a peg 2526. A right side end 2526*r* of peg 2526 engages a hole 2525 in the tang of blade 2508. A left side end 25261 of peg 2526 engages slot 2553, and can slide in slot 2553 along the longitudinal axis, on the right side of center slide 2552, as blade 2508 extends and retracts. The ends of slot 2553 are open, such that peg 2526 can extend past the front or rear ends of center slide 2552.

An activation spring 2509 is provided on the left side of center slide 2552. Activation spring 2509 includes a pair of L-shaped brackets 2509*f* and 2509*r* at the respective front and rear ends of activation spring 2509. Brackets 2509*f* and 2509*r* engage the respective front and rear ends of center slide 2552. With this construction, spring 2509 stretches, and produces spring tension between brackets 2509*f* and 2509*r*. Spring 2509 provides the force to extend or retract blade 2508 when the release mechanism is activated.

Knife 2500 is depicted in the extended, locked-open configuration, with blade 2508 extending out the front of frame 2502, along the longitudinal axis of frame 2502. Frame 2502 includes a pair of front and rear spring loaded projections 2504*f* and 2504*r*, respectively. Projections 2505*f* and 2505*r* are spring loaded towards the center of frame 2502, i.e., towards blade 2508.

As blade 2508 travels out of frame 2502, a rear portion 2508*r* of the tang of blade 2508 slides past front projection 2504*f*. This permits projection 2504*f* to spring into engagement with tang rear 2508*r*. This locks blade 2508 in the extended position, as it cannot retract past front projection 2504*f*. Thus, in the extended, locked configuration depicted in FIGS. 25-27, pivotable front projection 2504*f* engages a rear portion 2508*r* of the tang of blade 2508. This locks blade 2508 in the extended configuration, until front projection 2504*f* is moved out of engagement with tang rear 2508*r* by sliding left scale 2501 rearwards.

In this extended, locked configuration, peg 2526 extends just past the front end of center slide 2552. Peg 2526 nests against forward bracket 2509*f* of spring 2509 and thereby stretches spring 2509 in the forward direction, by the additional distance peg 2526 extends past the front end of slide 2552. Therefore, in the locked extended configuration, spring 2509 is exerting rearward force on peg 2526, and therefore, blade 2508. Therefore, when knife 2500 is extended, spring 2509 is exerting rearward retracting force on blade 2508. Thus, when blade 2508 is locked in the extended configuration, it is preloaded with rearward retraction force.

To activate the activation mechanism and automatically close knife 2500 into the retracted configuration, all that is needed is a slight manual movement of left scale 2501 rearwards. This rearward movement of left scale 2501, and therefore center slide 2552, will provide additional stretch to spring 2509 and assist with the retraction of blade 2508.

Automatically retracting blade 2508 from the extended configuration proceeds as follows. Frame 2502 includes a front recess 2522*f* to receive front pivotable projection 2504*f*, as it is moved away from blade 2508. Frame 2502 also includes a rear recess 2522*r*, to receive a rear pivotable projection 2504*r*. Rear pivotable projection 2504*r* is spring loaded towards the center of frame 2502, i.e., towards blade 2508.

Center slide 2552 includes an inclined front activation projection 2540*f* and a rear activation projection 2540*r*. To activate the release mechanism, unlock knife 2500, and automatically retract blade 2508 into the retracted configuration, the following occurs. Left scale 2501 is slid rearwards manually. This provides a slight additional stretch to spring 2509. Moving slide 2552 also causes front activation projection 2540*f* to slide past the inside (blade-side) of front pivotable projection 2504*f*. This moves front pivotable projection 2504*f* out of engagement with the rear of the tang of blade 2508, and blade 2508 is now free to slide rearwards. Because spring 2509 has been rearwardly pre-loaded, front bracket 2509*f* urges peg 2526 rearwards. This causes blade 2508 to slide rearwards in frame 2502, as left end 25261 of peg 2526 travels rearwards along slot 2553.

As peg 2526 impacts rear bracket 2509*r* of spring 2509, it will stretch bracket 2509*r* rearwards from the rear end of center slide 2552. This pre-loads spring 2509 with forward force for the extension of blade 2508 from within frame 2502.

Once blade 2508 has fully retracted into frame 2502, and peg 2526 will have slid past the rear end of center slide 2552, the tang of blade 2508 will have slid to the retracted configuration. As noted above, spring loaded rear pivotable projection 2504*r* is urged toward blade 2508. As the tang of blade 2508 slides past projection 2504*r*, projection 2504*r* will engage a locking notch 2521 in the tang of blade 2508. This locks blade 2508 into the retracted configuration.

Also, in this position, peg 2526 extends past the rear edge of center slide 2552. As peg 2526 moves past the end of slide 2552, it engages rear bracket 2529*r* and moves bracket 2509*r* slightly past the end of slide 2552. This stretches spring 2509. Stretched spring 2509 causes rear bracket 2509*r* to urge peg 2526, and therefore blade 2508, in the forward direction. However, blade 2508 is locked in the retracted configuration because projection 2504*r* is engaged in notch 2521. Nevertheless, moving peg 2526 past the rear edge of slide 2552 pre-loads blade 2508 in the extension direction.

To automatically extend blade 2508 from the retracted configuration, the following is performed to activate the automatic mechanism. Left scale 2501 is slid forward. This provides additional stretch to spring 2509. This also causes center slide 2552 to move forward. Rear activation projection 2540*r* of slide 2552 moves rear pivotable projection 2504*r* out of notch 2521. This releases blade 2508, and the force of stretched spring 2509 causes rear bracket 2509*r* to push peg 2526 (and therefore blade 2508) forward. Blade 2508 slides forward, out of frame 2502, until peg 2526 hits front bracket 2509*f*. Front projection 2504*f* engages the rear of the tang of blade 2508, to lock blade 2508 in the extended configuration, with peg 2526 urging front bracket 2509*f* slightly past the front edge of slide 2552. Thus, again, blade 2508 will be in the locked, extended configuration, pre-loaded to retract, when the activation mechanism is activated with a rearward movement of scale 2501.

To once again close knife 2500, left scale 2501 is slid to the rear. This moves center slide 2552 towards the rear. Moving center slide 2552 rearward causes front activation projection 2540*f* to urge front pivotable projection 2504*f* away from engagement with the rear of the tang of blade 2508. This unlocks blade 2508. Because blade 2508 had been pre-loaded towards the rear direction, because peg 2526 had extended activation spring 2509 slightly past the edge of center slide 2552, once front pivotable projection 2504*f* is moved out of the way, activation spring 2509 kicks blade 2508 to the rear, towards the retracted configuration. This rearward force and the rearward movement of scale 2501 is enough to cause peg 2526 too overshoot the rear edge of center slide 2552, engage rear bracket 2509*r*, and partially load spring 2509 with forward force. This forward force is used to extend blade 2508 forward to the extended configuration when the mechanism is once again activated.

Accordingly, as described above, an automatically opening tool in accordance with preferred embodiments of the invention can include a selectively operable locking mechanism, whereby small north/south movements of an outside scale of the tool along the tool's longitudinal axis can activate the mechanism for opening and/or closing the tool.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

Where this application has listed the steps of a method or procedure in a specific order, it may be possible, or even expedient in certain circumstances, to change the order in which some steps are performed, and it is intended that the particular steps of the method or procedure claim set forth herein below not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A lockable tool, comprising:

a frame having a rear proximal position, a front distal position, a forward direction along a longitudinal axis from the rear position to the front position, a length along the longitudinal axis, a width in a width direction perpendicular to the length, and a height along a vertical axis perpendicular to the length and the width;

the frame having a first plate extending along the longitudinal axis from the rear position to the forward position and having an inside surface facing in the width direction, a middle plate parallel to and aligned with the first plate, and a second plate parallel to and aligned with the middle plate, with a gap between the first plate and the middle plate;

a tool having a distal tip and a proximal base, and a biasing mechanism biasing the tool to the extended configuration, the base having a first notch and being coupled to the frame, the tool displaceable between a closed, retracted configuration wherein the tool is retracted within the frame and an open extended configuration wherein the tool is extended outside the frame and the tip points towards the forward direction;

the frame and tool configured to form a selectively releasable locking mechanism having at least one projection selectively and releasably received in the first notch of the tool to lock the tool in the retracted configuration, and to unlock the tool by releasing the projection from the first notch;

the second plate slidably mounted with respect to the middle plate and coupled to the locking mechanism, wherein sliding the second plate along the longitudinal axis with respect to the middle plate moves the projection linearly, in the width direction, out of the first notch to unlock the tool, allowing the biasing mechanism to bias the tool into the extended configuration.

2. The lockable tool of claim 1, wherein the tool is a knife blade.

3. The lockable tool of claim 1, wherein the tool is a screw driver, comb, corkscrew or file.

4. The lockable tool of claim 1, wherein the tool is pivotably coupled to the middle plate with a shaft and is biased into the open extended configuration with a resilient member coupled to the tool and the frame and adapted to urge the tool to rotate from the retracted to the extended configuration.

5. The lockable tool of claim 2, wherein the unlocking the locking mechanism permits the tool to extend out a front of the frame in the longitudinal direction.

6. The lockable tool of claim 1, wherein the tool is a knife blade and includes a second notch, the first and second notches are formed in the base of the tool, and the locking mechanism is adapted and configured such that the projection extends in the width direction into the second notch when the blade is in the extended configuration.

7. The lockable tool of claim 1, wherein the projection is attached to the frame and biased in the width direction, and the locking mechanism is configured and adapted such that sliding the second plate along the longitudinal axis moves the projection in the width direction out of the first notch.

8. The lockable tool of claim 7, wherein the tool is a knife blade pivotably coupled to the frame with a shaft and is biasable into the open extended configuration with a resilient member coupled to the tool and the frame, adapted to urge the tool to pivot from the retracted configuration to the extended configuration, the first and second notches are formed in the base of the blade, the projection extends in the width direction from the first plate, and a resilient plate urging member biases the second plate in a first direction along the longitudinal axis, whereby sliding the second plate opposite the first direction unlocks the locking mechanism.

9. The lockable tool of claim 1, wherein the projection of the locking mechanism is biased in a first width direction and includes an inclined end, and an inner surface of the second plate includes an inclined surface, and sliding the second plate along the longitudinal axis causes the inclined surface to contact the inclined end of the projection and displace the projection opposite the first width direction.

10. The lockable tool of claim 9, wherein the locking mechanism includes a projection base of substantially the same shape as the notch.

11. The lockable tool of claim 10, wherein the notch has a circular shape with a diameter larger than a smallest diameter of the projection base, and the notch has an open portion of the circular shape.

12. The lockable tool of claim 11, wherein the open portion of the notch has an angle of 80° to 10° of the circular shape.

13. The lockable tool of claim 12, wherein the blade is coupled to a spring and the spring biases the blade into the open configuration.

14. The lockable tool of claim 13, wherein the first and second notches are formed in the base of the blade.

15. The lockable tool of claim 14, wherein the projection is in the form of a circular base with a rod extending therefrom in the width direction.

16. A lockable tool, comprising:

a frame having a length along a longitudinal axis, a width perpendicular to the length along a width axis, and a height perpendicular to the length and width along a vertical axis, the frame having a first wall extending along the longitudinal axis from a rear proximal position to a front distal position and having a first outside surface facing in the direction of the width axis;

a first scale mounted at the first outside surface in a sliding arrangement along the longitudinal axis;

a tool having a distal tip and a proximal base coupled to the frame and displaceable between a closed, retracted configuration within the frame and an open extended configuration outside the frame, wherein the distal tip points towards the front distal direction;

a selectively releasable locking mechanism coupled to the first scale and adapted to selectively lock the tool in the extended configuration and in the retracted configuration and to unlock the tool when the locking mechanism is released by sliding the first scale along the longitudinal axis.

17. The lockable tool of claim 16, wherein:

the locking mechanism is linearly biased in the width direction, and sliding the first scale with respect to the frame linearly urges a projection of the locking mechanism along the width direction out of a notch in the tool, to unlock the mechanism.

18. The lockable tool of claim 17, wherein the locking mechanism has a plunger shaped projection, with a circular base and a shaft extending from the base along the width direction, and the base is biased in a direction to extend into the notch in the tool.

19. The lockable tool of claim 16, wherein the tool is a knife blade.

20. The lockable tool of claim 19, wherein a resilient biasing member is coupled to the blade to bias the blade into the open extended configuration, whereby sliding the first scale to unlock the locking mechanism causes the tool in the closed configuration to automatically open to the extended configuration.

21. A lockable tool, comprising:

a frame having a length along a longitudinal axis, a width perpendicular to the length along a width axis, and a height perpendicular to the length and width along a vertical axis, the frame having a first wall extending along the longitudinal axis from a rear proximal position to a forward distal position and having a first outside surface facing in the direction of the width axis;

a first scale mounted at the first outside surface in a sliding arrangement along the longitudinal axis;

a tool having a distal tip and a proximal base coupled to the frame and displaceable between a closed, retracted configuration wherein the distal tip points towards the rear direction and an open extended configuration wherein the distal tip points towards the forward direction;

releasable lock means linearly slidable in the width direction for locking the tool in the extended or in the retracted configurations when the scale is in a locking position, and unlocking the tool when the scale is slid along the longitudinal axis from the locking position.

* * * * *